US012100912B2

(12) United States Patent
Peloza et al.

(10) Patent No.: US 12,100,912 B2
(45) Date of Patent: Sep. 24, 2024

(54) CONNECTOR WITH SHIELDED TERMINALS

(71) Applicant: Molex, LLC, Lisle, IL (US)

(72) Inventors: Kirk B. Peloza, Naperville, IL (US); Vivek Shah, Buffalo Grove, IL (US); Andrew Kolak, Villa Park, IL (US); Dan Wenzel, Hoffman Estates, IL (US); Matt Cox, Bolingbrook, IL (US); Ayman Isaac, Glendale, AZ (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 18/380,672

(22) Filed: Oct. 17, 2023

(65) Prior Publication Data

US 2024/0047923 A1 Feb. 8, 2024

Related U.S. Application Data

(63) Continuation of application No. 17/288,956, filed as application No. PCT/US2019/064260 on Dec. 3, 2019, now Pat. No. 11,848,522.

(60) Provisional application No. 62/774,650, filed on Dec. 3, 2018.

(51) Int. Cl.

| | |
|---|---|
| ***H01R 13/6581*** | (2011.01) |
| ***H01R 13/627*** | (2006.01) |
| ***H01R 13/6471*** | (2011.01) |
| ***H01R 13/6598*** | (2011.01) |

(52) U.S. Cl.

CPC ..... *H01R 13/6581* (2013.01); *H01R 13/6275* (2013.01); *H01R 13/6471* (2013.01); *H01R 13/6598* (2013.01)

(58) Field of Classification Search

CPC ............ H01R 13/6581; H01R 13/6582; H01R 13/6583; H01R 13/6598; H01R 13/6471; H01R 13/6275

USPC ..................................................... 439/607.01

See application file for complete search history.

(56) References Cited

U.S. PATENT DOCUMENTS

| | | | |
|---|---|---|---|
| 9,608,347 | B2 | 3/2017 | Nagata et al. |
| 10,236,608 | B2 | 3/2019 | Nagata et al. |
| 10,243,288 | B2 | 3/2019 | Matsuzawa |
| 2003/0008560 | A1 | 1/2003 | Tolmie |
| 2009/0023336 | A1 | 1/2009 | Kondo et al. |
| 2014/0024257 | A1 | 1/2014 | Castillo et al. |

(Continued)

FOREIGN PATENT DOCUMENTS

| | | | |
|---|---|---|---|
| CN | 102177622 | A | 9/2011 |
| CN | 206742586 | U | 12/2017 |

(Continued)

OTHER PUBLICATIONS

International Search Report and Written Opinion received for PCT Application No. PCT/US2019/064260, mailed as on Mar. 26, 2020, 17 Pages.

*Primary Examiner* — Khiem M Nguyen

(57) ABSTRACT

A number of connectors and related methods that allow for high data rate transmissions are described. An example connector includes a housing and a wafer. The water includes signal conductors, a ground conductors, a flexible shield, and a rigid shield. The flexible shield includes terminal end portions, cantilever spring end portions, and a flexible shield body between the terminal end portions and the cantilever spring end portions. The flexible shield body covers a first portion of the ground conductors, and the rigid shield covers a second portion of the ground conductors.

20 Claims, 21 Drawing Sheets

(56) References Cited

U.S. PATENT DOCUMENTS

| | | | |
|---|---|---|---|
| 2014/0202763 | A1 | 7/2014 | Adachi et al. |
| 2015/0295356 | A1 | 10/2015 | Tziviskos et al. |
| 2016/0104976 | A1 | 4/2016 | Yu et al. |

FOREIGN PATENT DOCUMENTS

| | | | |
|---|---|---|---|
| JP | 2013038076 | A | 2/2013 |
| JP | 2013073987 | A | 4/2013 |
| JP | 3199094 | U | 7/2015 |
| JP | 2018010724 | A | 1/2018 |
| JP | 2019003816 | A | 1/2019 |
| KR | 20100091103 | A | 8/2010 |
| WO | 2010030622 | A1 | 3/2010 |
| WO | 2020117824 | A1 | 6/2020 |

CONNECTOR WITH SHIELDED TERMINALS

CROSS-REFERENCE TO RELATED APPLICATIONS

This application is a continuation of U.S. application Ser. No. 17/288,956, titled "CONNECTOR WITH SHIELDED TERMINALS," filed Apr. 27, 2021, which is the national stage entry of PCT/US2019/064260, titled "CONNECTOR WITH SHIELDED TERMINALS," filed Dec. 3, 2019, which claims the benefit of and priority to U.S. Provisional Application 62/774,650, filed Dec. 3, 2018, the entire content and disclosures of each of which applications are hereby incorporated herein by reference.

TECHNICAL FIELD

This disclosure relates to the field of input/output (I/O) connectors, more specifically to I/O connectors that functions to transmit and receive data at high data rates, (approximately 112 gigabits (Gbits)).

INTRODUCTION

This section introduces aspects that may be helpful to facilitate a better understanding of the described invention(s). Accordingly, the statements in this section are to be read in this light and are not to be understood as admissions about what is, or what is not, in the prior art.

Many I/O connectors are configured as a stacked sandwich of wafers and are very sensitive to small dimensional variations. Further, because metal elements in these wafers are oriented at a right angle to a paddle card or module printed circuit board (PCB), electrical contacts connecting a "host" printed circuit board (PCB) to the paddle card or module PCB must often be rotated 90° through what is called a hemi-form. Such a configuration is difficult to construct and assemble. Accordingly, improvements are desirable in the design of such I/O connectors.

SUMMARY

Example I/O connectors and related methods that allow for high data rate transmissions are described. The connectors include protective shields to provide increased mechanical strength and signal integrity, among other things.

An example connector includes a housing and a wafer. The water includes signal conductors, a ground conductors, a flexible shield, and a rigid shield. The flexible shield includes terminal end portions, cantilever spring end portions, and a flexible shield body between the terminal end portions and the cantilever spring end portions. The flexible shield body covers a first portion of the ground conductors, and the rigid shield covers a second portion of the ground conductors.

In one aspect, a cantilever spring end portion among the cantilever spring end portions of the flexible shield makes electrical and mechanical contact with the rigid shield. In another aspect, a cantilever spring end portion among the cantilever spring end portions of the flexible shield makes electrical and mechanical contact with a ground conductor among the ground conductors. The cantilever spring end portions of the flexible shield can also make electrical and mechanical contact between the plurality of ground conductors and the rigid shield.

In other aspects, the terminal end portions of the flexible shield are secured to terminal ends of the ground conductors. The terminal end portions of the flexible shield can be crimped to terminal ends of the plurality of ground conductors. In other aspects, a terminal end of a ground conductor among the ground conductors includes an indentation, and a terminal end portion among the terminal end portions of the flexible shield is secured to the indentation of the ground conductor.

In another example, the wafer further includes a molding. The molding includes a number of posts, the rigid shield includes a number of openings, and the posts of the molding extend through the openings of the rigid shield to secure the rigid shield with the molding. In some cases, the connector also includes welds between the rigid shield and the ground conductors.

In some cases, a longitudinal portion of the flexible shield is configured at a nominal distance from a cantilever beam section of a signal conductor among the signal conductors. The flexible shield is configured in some cases to flex in a same direction as the ground conductors yet maintain a nominal distance from the plurality of ground conductors.

In another example, the connector also includes a second wafer. The second wafer includes second signal conductors, second ground conductors, a second flexible shield, and a second rigid shield. The second flexible shield covers a first portion of the second ground conductors, and the second rigid shield covers a second portion of the second ground conductors.

Another example electrical connector includes conductors, a flexible shield, and a rigid shield. The flexible shield includes terminal end portions, cantilever spring end portions, and a flexible shield body between the terminal end portions and the cantilever spring end portions. The flexible shield body covers a first portion of the conductors. The rigid shield covers a second portion of the conductors, and the cantilever spring end portions of the flexible shield make electrical and mechanical contact between the conductors and the rigid shield.

A further description of these and additional embodiments is provided by way of the figures, notes contained in the figures and in the claim language included below. The claim language included below is incorporated herein by reference in expanded form, that is, hierarchically from broadest to narrowest, with each possible combination indicated by the multiple dependent claim references described as a unique standalone embodiment.

BRIEF DESCRIPTION OF THE DRAWINGS

The present invention is illustrated by way of example and not limited in the accompanying figures in which like reference numerals indicate similar elements and in which.

Figure 1:
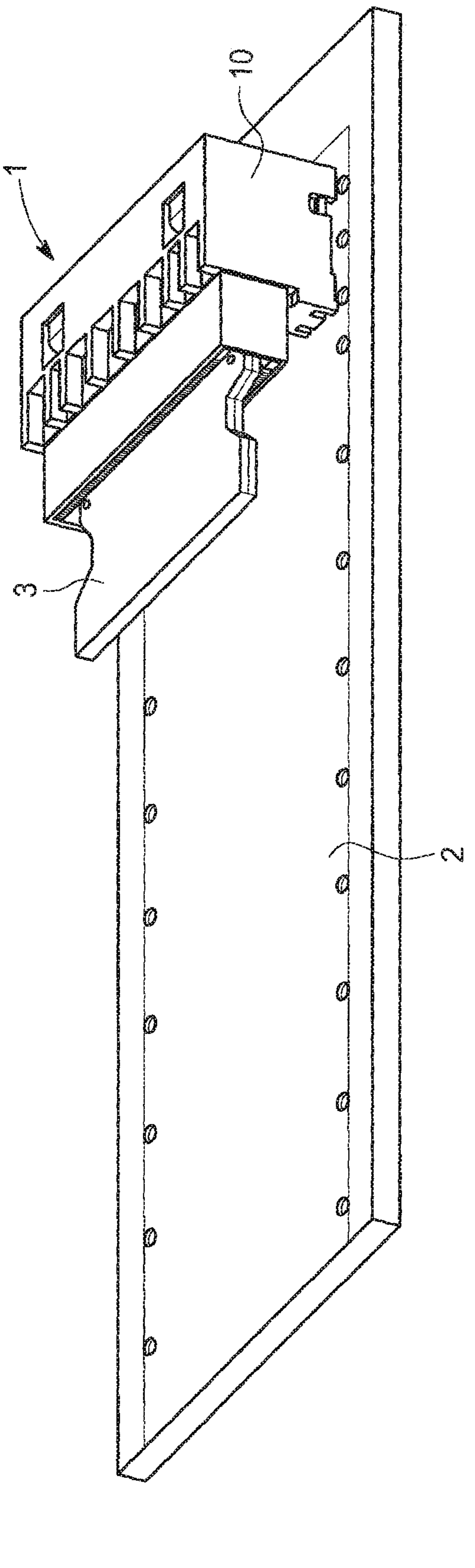
FIGS. 1 to 3B depict different views of an exemplary I/O connector according to embodiments of the invention.

Specific embodiments of the present invention are disclosed below with reference to various figures and sketches. Both the description and the illustrations have been drafted with the intent to enhance understanding. For example, the dimensions of some of the elements in the figures may be exaggerated relative to other elements, and well-known elements that are beneficial or even necessary to a commercially successful implementation may not be depicted so that a less obstructed and a more clear presentation of embodiments may be achieved. Further, dimensions and other parameters described herein are merely exemplary and non-limiting.

DETAILED DESCRIPTION

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described herein without departing from the spirit and scope of the present invention. Thus, the specification and drawings are to be regarded as illustrative and exemplary rather than restrictive or all-encompassing, and all such modifications to the specific embodiments described herein are intended to be included within the scope of the present invention. Yet further, it should be understood that the detailed description that follows describes exemplary embodiments and is not intended to be limited to the expressly disclosed combination(s). Therefore, unless otherwise noted, features disclosed herein may be combined together to form additional combinations that were not otherwise described or shown for purposes of brevity.

As used herein and in the appended claims, the terms “comprises,” “comprising,” or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms “a” or “an”, as used herein, are defined as one or more than one. The term “plurality”, as used herein, is defined as two or more than two. The term “another”, as used herein, is defined as at least a second or more. Unless otherwise indicated herein, the use of relational terms, if any, such as “first” and “second”, “top”, “bottom”, “rear” and the like are used solely to distinguish one entity or action from another entity or action without necessarily requiring or implying any actual such relationship, priority, importance or order between such entities or actions.

The term “coupled”, as used herein, means at least the energy of an electric field associated with an electrical current in one conductor is impressed upon another conductor that is not connected galvanically. Said another way, the word “coupling” is not limited to either a mechanical connection, a galvanic electrical connection, or a field-mediated electromagnetic interaction though it may include one or more such connections, unless its meaning is limited by the context of a particular description herein.

The use of “or” or “and/or” herein is defined to be inclusive (A, B or C means any one or any two or all three letters) and not exclusive (unless explicitly indicated to be exclusive); thus, the use of “and/or” in some instances is not to be interpreted to imply that the use of “or” somewhere else means that use of “or” is exclusive.

Terminology derived from the word “indicating” (e.g., “indicates” and “indication”) is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

The terms “including” and/or “having”, as used herein, are defined as comprising (i.e., open language).

It should also be noted that one or more exemplary embodiments may be described as a method. Although a method may be described in an exemplary sequence (i.e., sequential), it should be understood that such a method may also be performed in parallel, concurrently or simultaneously. In addition, the order of each formative step within a method may be re-arranged. A described method may be terminated when completed, and may also include additional steps that are not described herein if, for example, such steps are known by those skilled in the art.

As used herein, the term “embodiment” or “exemplary” mean an example that falls within the scope of the invention(s).

Referring now to FIG. 1 there is depicted an exemplary I/O connector 1 according to an embodiment of the invention. As depicted, the connector 1 may be an octal, small form factor pluggable (OFSP) connector that functions to mechanically and electrically connect a host printed circuit board (PCB) 2 to a module PCB 3. In embodiments, the data rate of transmissions conducted by electrical elements of the connector 1 and PCBs 2,3 may be 112 Gbits per second (Gbps), for example.

Figure 2:
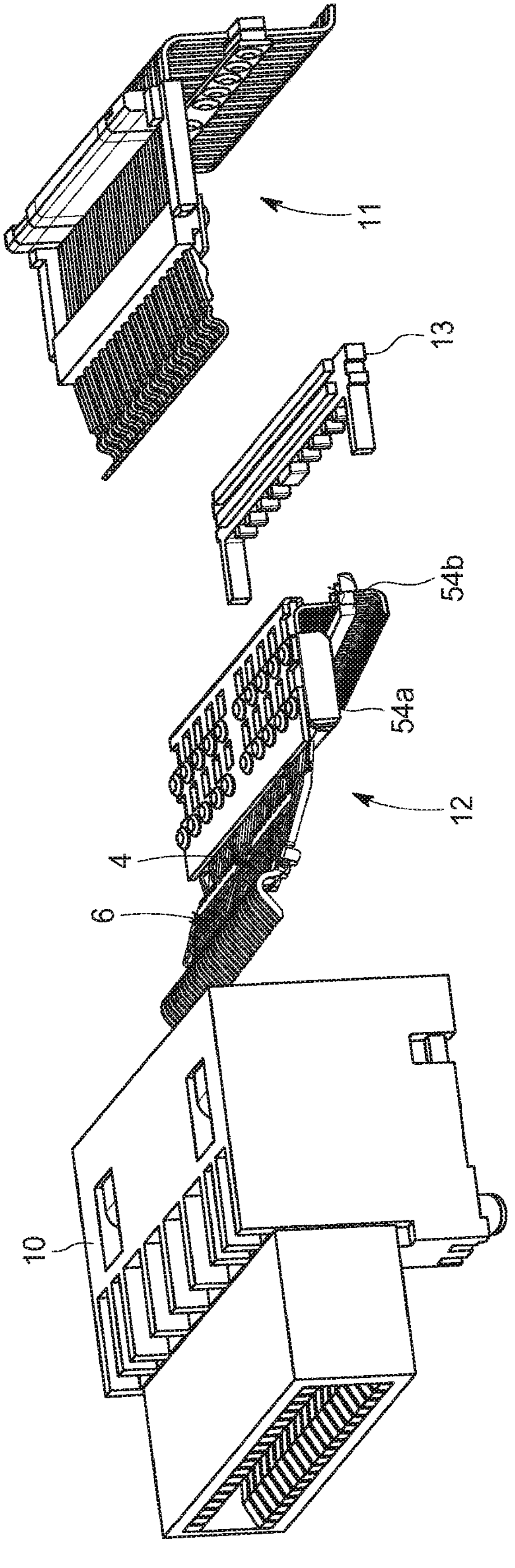

FIG. 2 depicts an exploded view of an exemplary I/O connector 1 comprising a housing 10, a wafer 12 with both flexible shields 4, 6 and rigid shield 5 attached, another wafer 11 with both flexible shields and a rigid shield attached and a bumper 13. For purposes of explanation only, wafer 11 may be referred to as a "first" or "top" wafer while wafer 12 may be referred to as a "second" or "bottom" wafer. Further, it should be understood that an inventive connector may comprise more than two wafers, more than one of each type of wafer and each wafer may be connected to one or more flexible and/or rigid shields.

In an embodiment the bumper 13 may function to limit the movement of wafer 11. For example, the bumper 13 may exert a force on a base of the rigid shield attached to wafer 11. In an embodiment the bumper is composed of a plastic, for example.

Figure 3A:
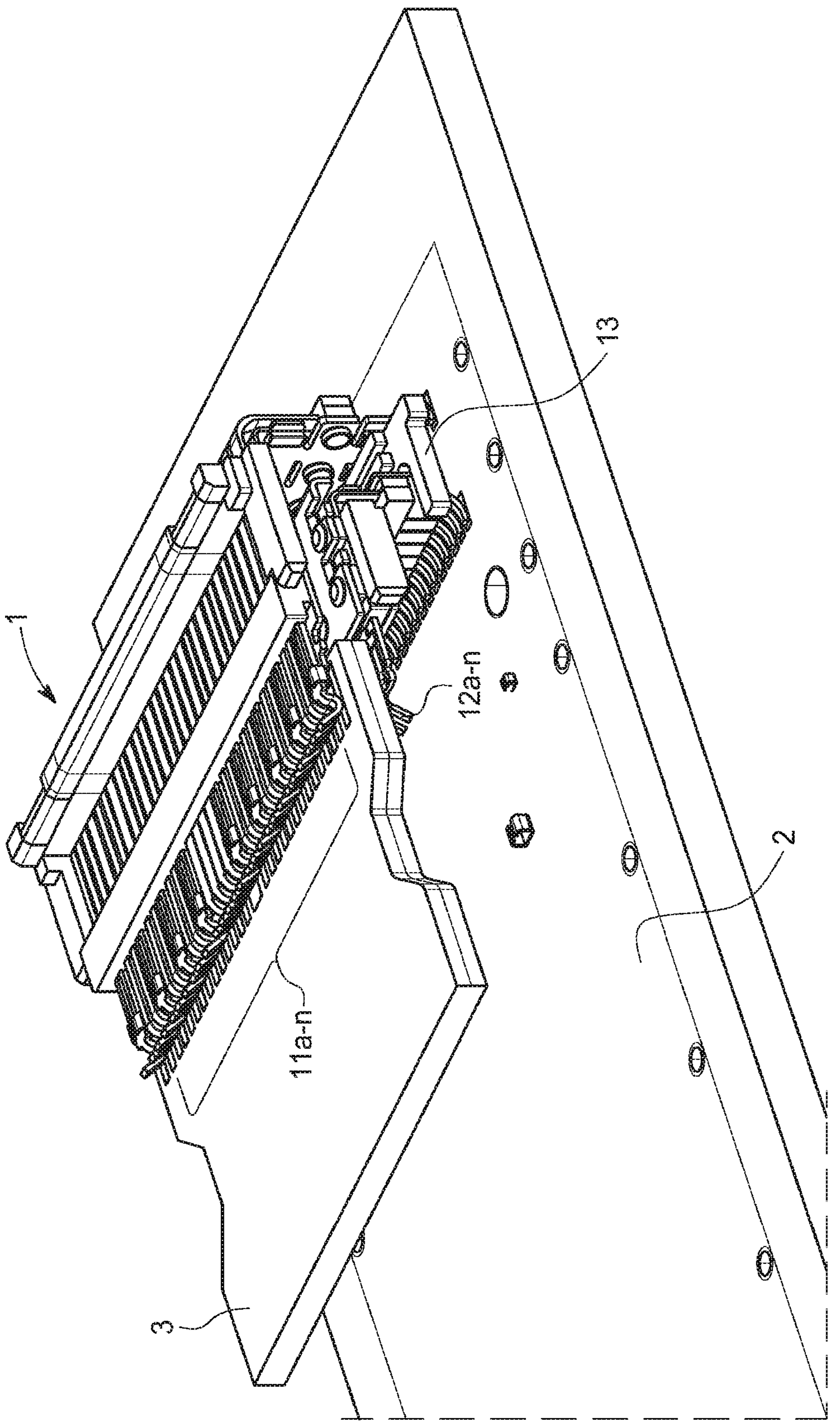

With reference now to FIG. 3A, there is depicted the I/O connector 1 in FIG. 1 with its housing 10 removed to enable the reader to view elements of the connector 1. As depicted a plurality of electrical, terminal end sections 11*a* to *n* (where "n" indicates the last section) of ground (G) and signal (S) conductors of top wafer 11 and electrical, terminal end sections 12 *a-n* of ground (G) and signal (S) conductors of bottom wafer 12 (though the latter is only partially shown) are depicted, respectively. The module PCB 3 may be mechanically and electrically secured and connected, to the connector 1 by press fitting or otherwise inserting the module PCB 3 in between the plurality of terminal end sections 11*a-n* of ground (G) and signal (S) conductors on a top surface of the PCB 3 and the plurality of terminal end sections 12 *a-n* of ground (G) and signal (S) conductors on a bottom surface of the PCB 3 (see also FIG. 7). In an embodiment, each terminal end section 11*a-n*, 12*a-n* may comprise a terminal end of an electrical conductor where a set of four conductors may be referred to as a transmission line. In an embodiment, each one of the four conductors making up a transmission line may be operable to function either as a ground (G) or signal (S) conductor. In an embodiment wafer 11 and wafer 12 may comprise a plurality of parallel positioned transmission lines, where each transmission line comprises two parallel signal conductors and two parallel ground conductors and their respective electrical, terminal end sections configured in a G-S-S-G arrangement to make mechanical and electrical connection with module PCB 3.

In some embodiments, a transmission line may be made of an insert molding. Further, it should be understood that the number of transmission lines and type of transmission lines in a wafer depicted in the figures is merely exemplary. Accordingly, a wafer may contain as many double-ended or single-ended transmission lines or other lines as desired. The structure of an exemplary wafer may be stiff in order to provide support for solderable elements. Accordingly, plastic supports that might otherwise be used for this purpose are not needed. Further, such a stiff wafer structure provides support when the terminal end sections 12 *a-n* are contacted to a paddle card or PCB. In more detail, as terminal end sections 12 *a-n* (i.e., terminal ends) make contact with a paddle card or PCB, a certain minimum force may be applied by the stiffness of the wafer at the interface between the terminal end sections 12 *a-n* and the paddle card or PCB to ensure good electrical connection.

Figure 3B:
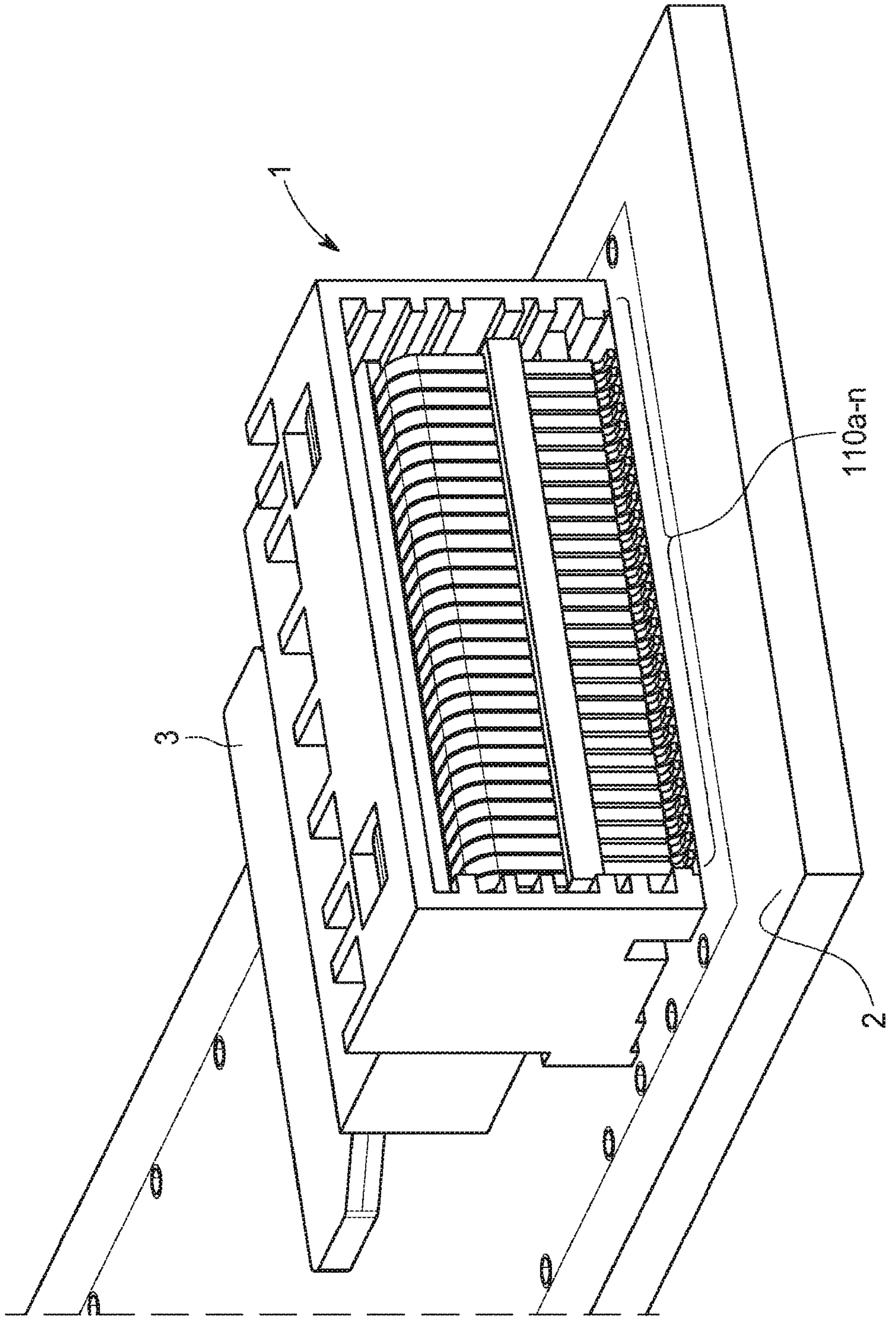

FIG. 3B depicts a rear view of the exemplary I/O connector 1. As shown wafer 11 may comprise a plurality of tail sections 110*a* to *n* of which may be soldered to points on the host PCB 2. Though not shown, tail sections of wafer 12 may similarly be soldered to points on the host PCB 2. In an embodiment, an exemplary width of a tail section may be 250 microns and a spacing between each section may be 0.6 mm (i.e., a 0.6 mm pitch).

Figure 4A:
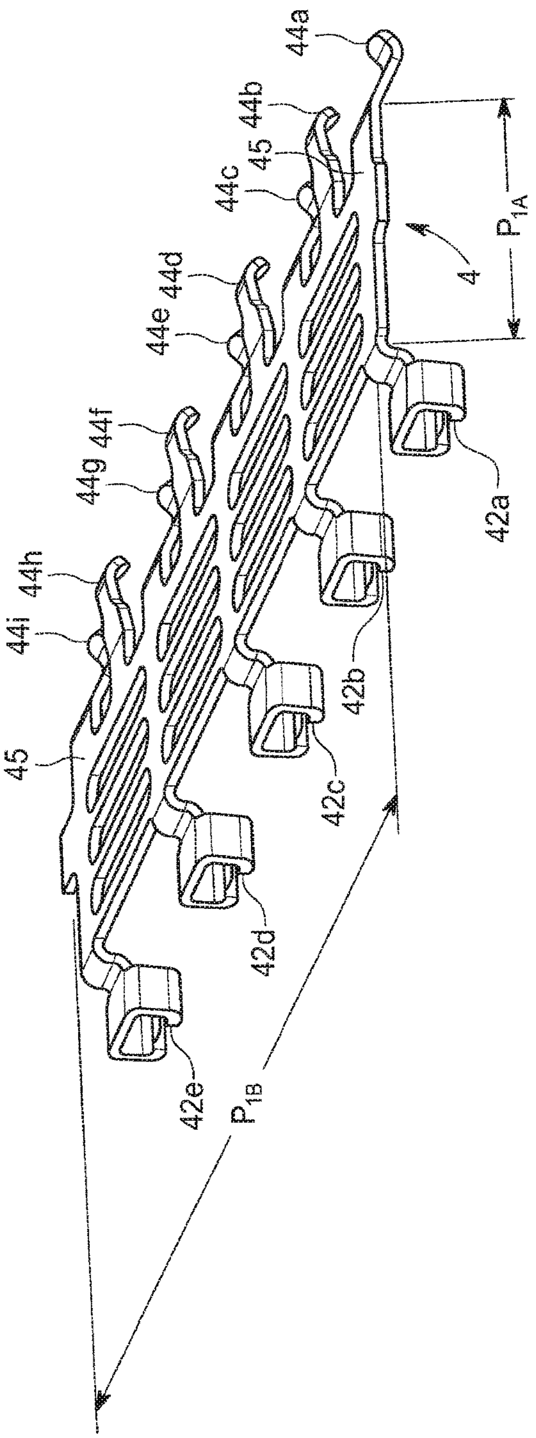
FIGS. 4A and 4B depict perspective views of an exemplary, self-aligning flexible shield according to an embodiment of the invention.
Figure 4B:
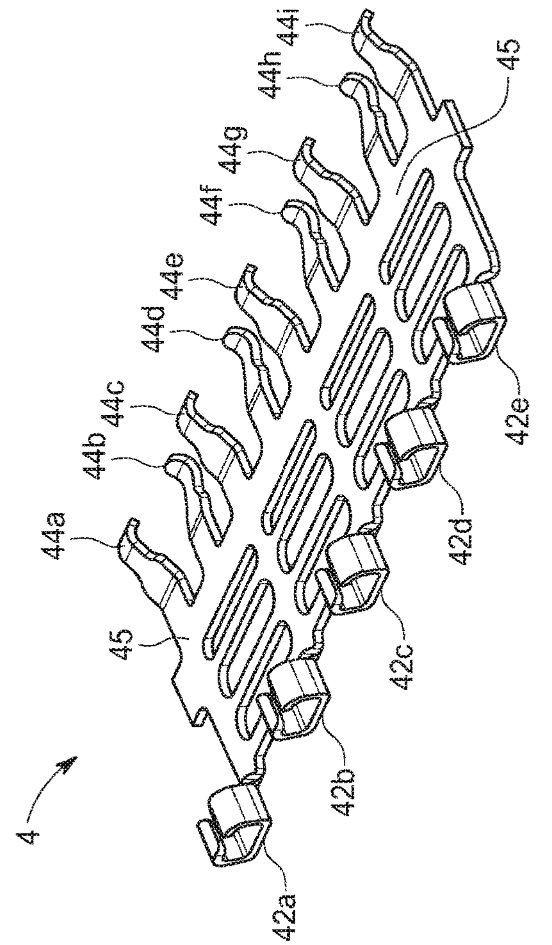

Referring now to FIGS. 4A and 4B there is depicted perspective views of an exemplary, self-alignable flexible shield 4 according to an embodiment of the invention. As shown the exemplar shield 4 may comprise a plurality of terminal end portions 42*a* to *n*, where "n" represents the last end portion (only portions 42*a* to 42*e* are shown) and a plurality of secondary end portions 44*a-n* connected by a shield body 45. Also shown in FIG. 4A are two indicators $p_{1a}$ and $p_{1b}$ for flexible, longitudinal and transverse portions, respectively, of shield 4 that, collectively, make up an area that substantially corresponds to the body 45 of shield 4. Said another way, a plurality of flexible, longitudinal and transverse portions $p_{1a}$ and $p_{1b}$ make up an area of the body 45 of shield 4. In more detail one longitudinal portion $p_{1a}$ may extend from the longitudinal end of portion 42*a* to the longitudinal end of portion 44*a* and may have a width substantially equal to width of portion 42*a* (e.g., end of a terminal), while a transverse portion $p_{1b}$ may extend from the lower transverse end of portion 42*a* to the upper transverse end of portion. FIG. 6D provides some exemplary dimensions of an inventive shield 4. A more detailed discussion of these portions is set forth elsewhere herein.

Referring now to FIGS. 5A to 5E there is illustrated a configuration of exemplary, self-aligning flexible shields 4, 6, where each shield 4, 6 may be configured to cover a first portion of ground conductors within conductors of bottom wafer 12. The conductors and their integral terminal end sections 12*a-n* making up a transmission line may be configured as an exemplary, cantilever-beam constructed conductor, for example.

As will be explained in more detail herein, a flexible shield provided by the present invention, such as shield 4 for example, may be relatively thin (see exemplary dimensions in FIG. 6D) and may be configured to correspondingly bend, deflect of flex (collectively "flex") in substantially the same direction and at substantially the same time as the ground (G) terminal end sections of ground conductors of a wafer flex yet maintain a nominal distance from respective signal (S) terminal end sections of signal conductors. For example, shield 4 may be connected to a plurality of terminal end sections 12*a-n* and may flex when one or more of the ground (G) terminal end sections 12*a-n* flexes without applying a force on the remaining contact end sections 12*a-n*.

In embodiments of the invention inventive flexible shields may be composed of a metal alloy, such as a copper alloy (e.g., C70250 or C70252).

Figure 6A:
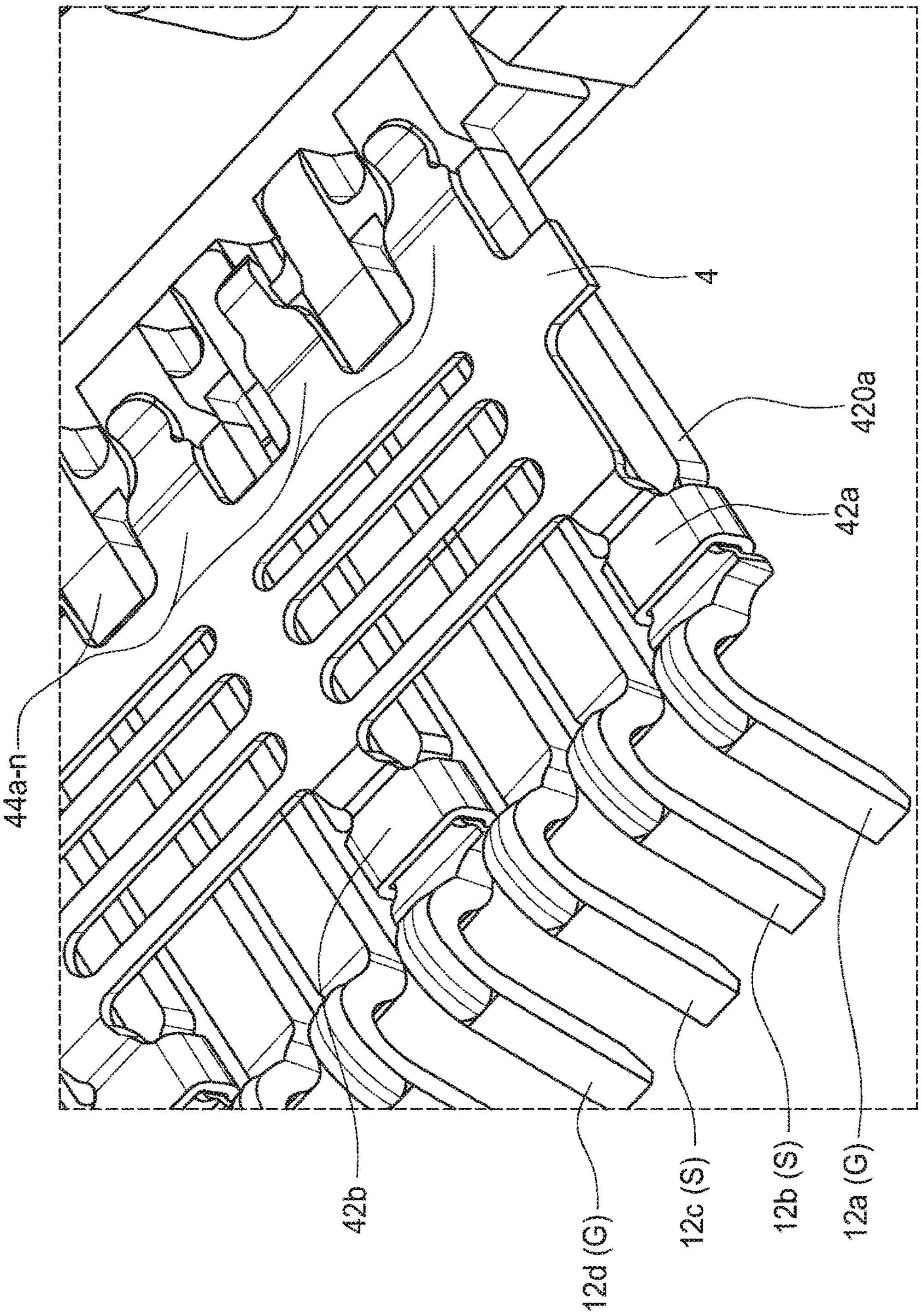
FIGS. 6A to 6C depict portions of an exemplary, self-aligning flexible shield configured to function to make electrical and mechanical contact with ground (G) terminal end sections of a wafer according to embodiments of the invention.
Figure 7:
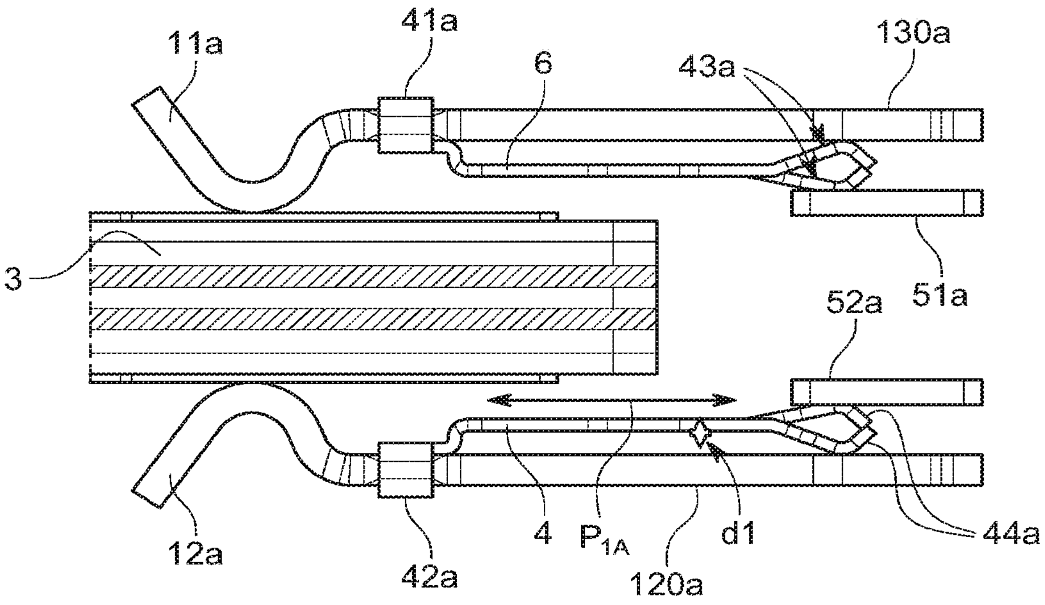
FIG. 7 depicts a side view of a module PCB mechanically secured, and electrically connected, to terminal end sections of electrical conductors of an exemplary connector according to embodiments of the invention.

In embodiments, flexible shields provided by the present invention may function to mechanically and electrically connect terminal end sections of ground (G) conductors to one another (see FIG. 6A where shield 4 connects sections 12*a*,*d*) as well as electrically connect ground (G) sections of a rigid shield 5 to the ground conductors (see FIG. 7, where ground sections 51*a*,52*a* of rigid shields are electrically connected to cantilever beams sections 120*a*, 130*a* of ground (G) conductors by secondary end sections 43*a*, 44*a* (e.g., spring-like, deformable end sections) of wafers 11,12.

In addition, further functions of an inventive flexible shield are to shield conductors of a transmission line of a respective wafer that the shield covers from electromagnetic interference (EMI)(e.g., cross-talk) from transmission lines of adjacent wafers and to adjust or otherwise contribute to the overall impedance of the electrical ground (G) of a given wafer.

In an alternative embodiment, rather than be composed of a metal alloy inventive flexible shields may be composed of a non-metallic material for electrical conduction. In such an embodiment it is expected that the shield could still function to connect ground conductors of a transmission line to one another, however, the ability to shield the conductors of transmission lines from EMI is expected to be reduced.

Figures 5A, 5B, 5C, 5D, 5E:
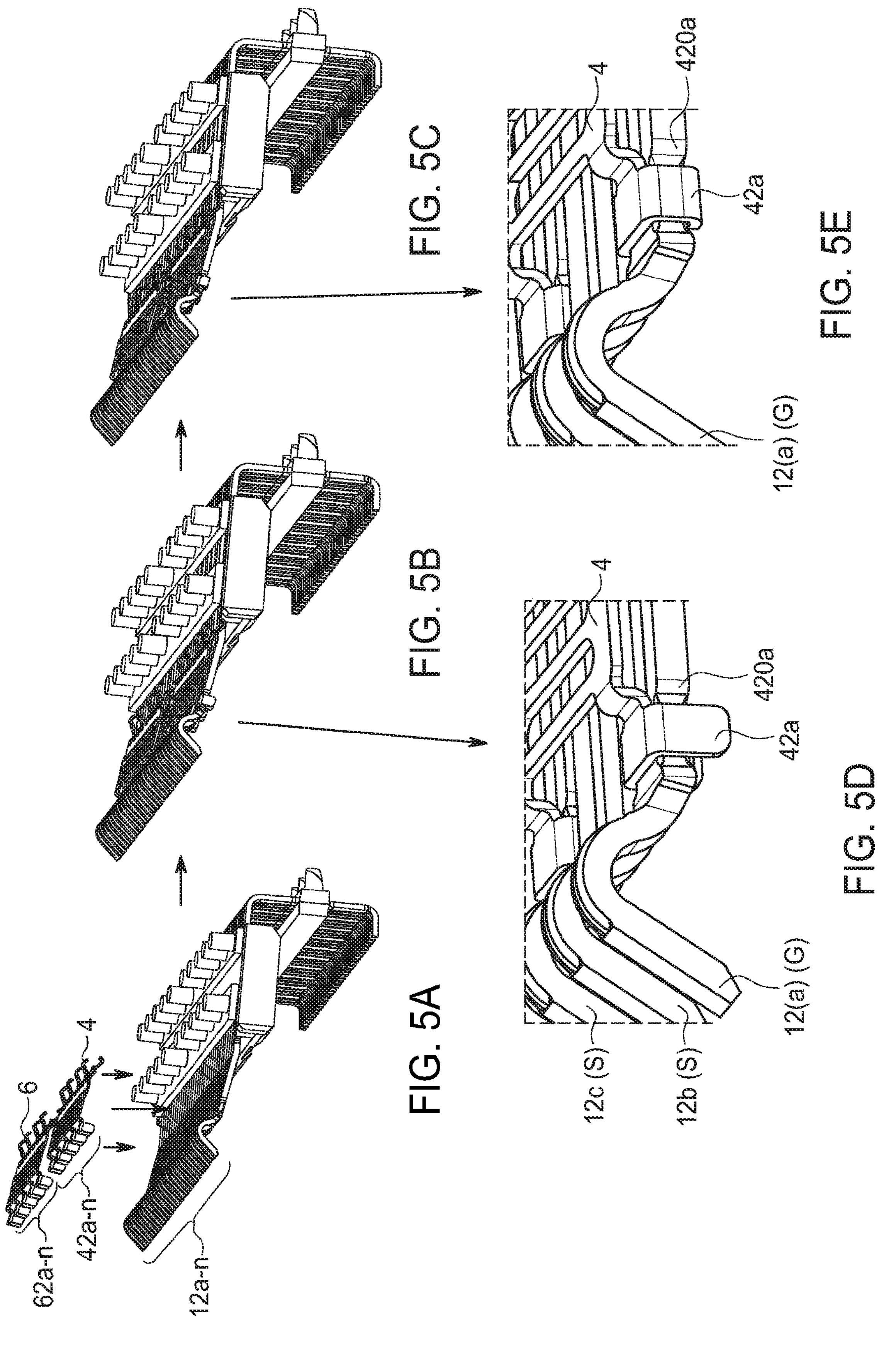
FIGS. 5A to 5E illustrate a configuration of an exemplary, self-aligning flexible shield according to embodiments of the invention.

FIG. 5D illustrates an enlarged version of FIG. 5B that depicts a terminal end portion 42*a* of the shield 4 in aligned, electrical and mechanical contact with a ground (G), terminal end section 12*a* of wafer 12. As shown the portion 42*a* is shaped as an open-ended rectangle. However, the shape of the portion 42*a* need not be an open-ended rectangle. Rather, portion 42*a* may be formed to make mechanical and electrical contact with the shape of a particular ground (G), terminal end section of a particular wafer. FIGS. 5B and 5D depict the portion 42*a* aligned, yet unsecured to ground (G), terminal end section 12*a* while FIGS. 5C and 5E depict the portion 42*a* aligned and secured to ground (G), terminal end section 12*a*.

In more detail, in an embodiment, after the shield 4 is aligned over wafer 12 (described further herein) each of the aligned portions 42*a-n* may be crimped to (i) prevent the shield 4 from moving once it is aligned over wafer 12, (ii) to assist in maintaining a desired spacing between terminal end sections 12*a-n* as well as (iii) to make a secure, mechanical and electrical connection with a respective ground (G), terminal end sections 12*a-n* of wafer 12 though it should be understood that crimping is just one means or method of preventing the shield 4 from moving and for mechanically and electrically securing portions of a flexible shield to ground (G), terminal end sections of a wafer.

It should be understood that an exemplary flexible shield may be similarly configured over top wafer 11, though the ground (G), terminal end sections 11*a-n* of wafer 11 are bent up instead of down as in sections 12*a-n* and crimped.

In embodiments of the invention, portions of an inventive flexible shield are configured to function to make electrical and mechanical contact with ground (G) elements of a wafer and do not so function to make contact with signal (S) elements of the wafer. For example, referring now to FIGS. 6A to 6C there is depicted portions 42*a,b,c* of the shield 4 configured to function to make electrical and mechanical contact with ground (G), terminal end sections 12*a,d,g* of wafer 12 and do not so contact signal (S), terminal end sections 12*b,c,e,f* of wafer 12.

FIG. 6A depicts a close-up view of an exemplary flexible shield 4. As illustrated, portions 42*a,b* of one end of the shield 4 are configured to function to make electrical and mechanical contact with ground (G), terminal end sections 12*a,d* of wafer 12 and do not so contact signal (S), terminal end sections 12*b,c* of wafer 12. The opposite end of the shield 4 comprises secondary end portions 44*a-n* configured to function to make electrical and mechanical contact with electrical ground (G) sections of a rigid shield (not shown in FIG. 6A).

Figure 6B:
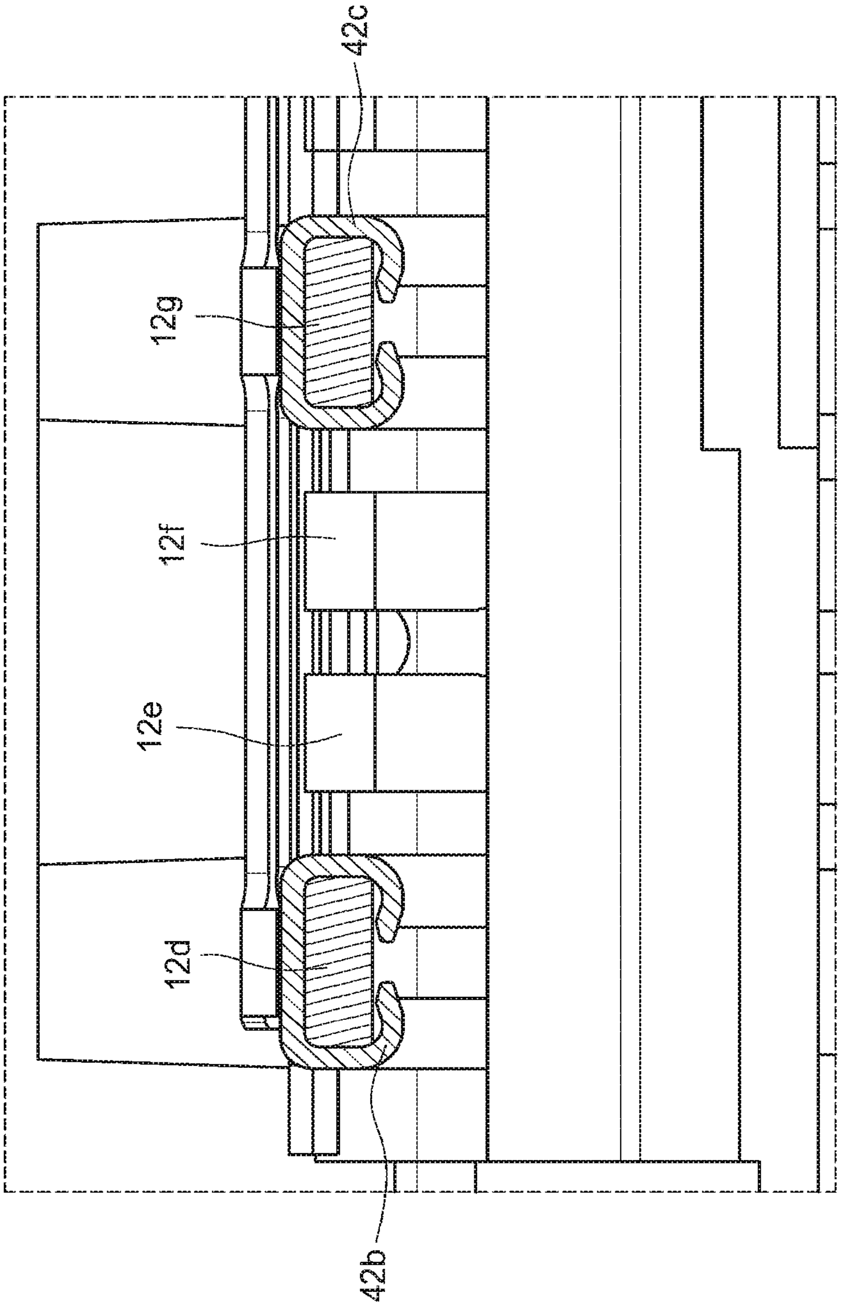
Figure 6C:
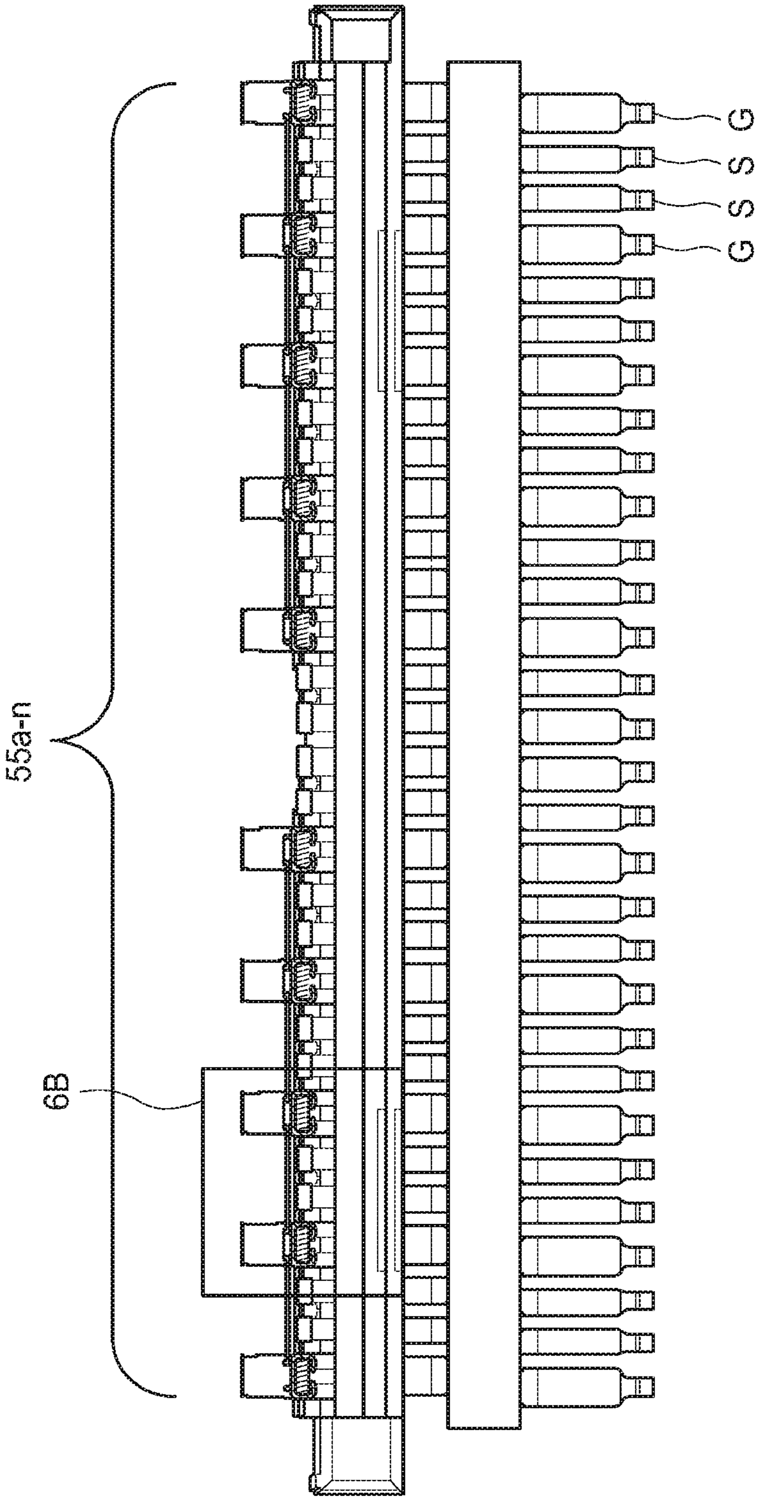
Figure 6D:
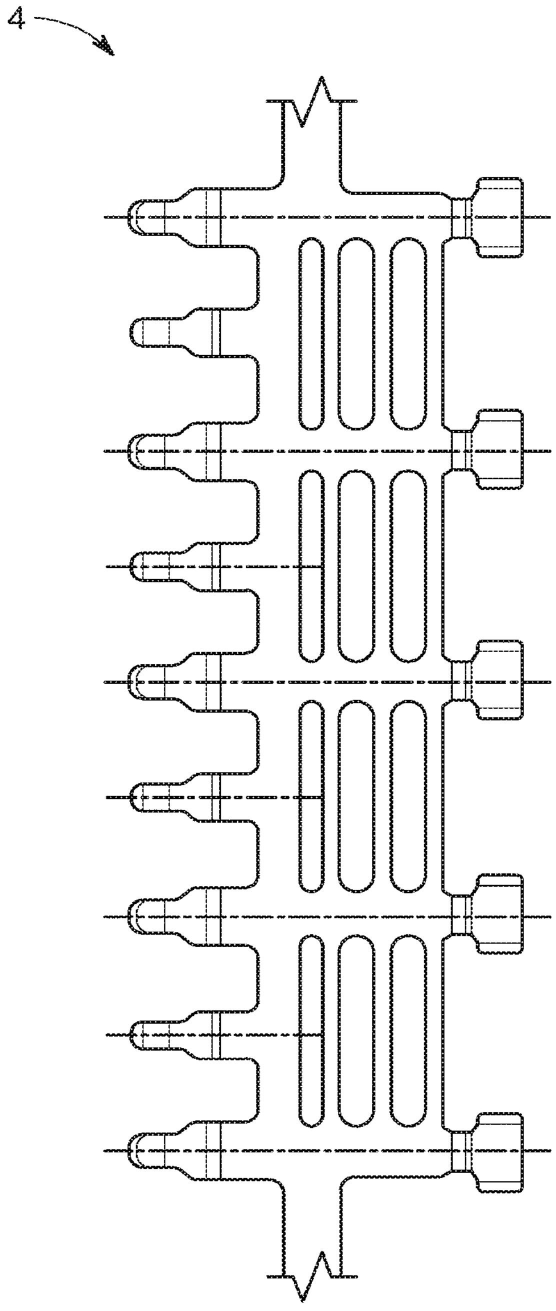
FIG. 6D illustrates exemplary dimensions of a self-aligning, flexible shield according to an embodiment of the invention.

FIGS. 6B and 6C depict a view of portions 42 *b, c* of one end of the shield 4 configured to function to make electrical and mechanical contact with ground (G), terminal end sections 12*d,g* of wafer 12 via crimping without contacting signal (S), terminal end sections 12*e,f* of wafer 12.

FIG. 6D illustrates exemplary dimensions of a flexible shield 4 according to an embodiment of the invention, it being understood that each of the dimensions shown in FIG. 6D may be modified to correspond to the configuration of ground conductors of transmission lines a shield is connected to.

Figure 6E:
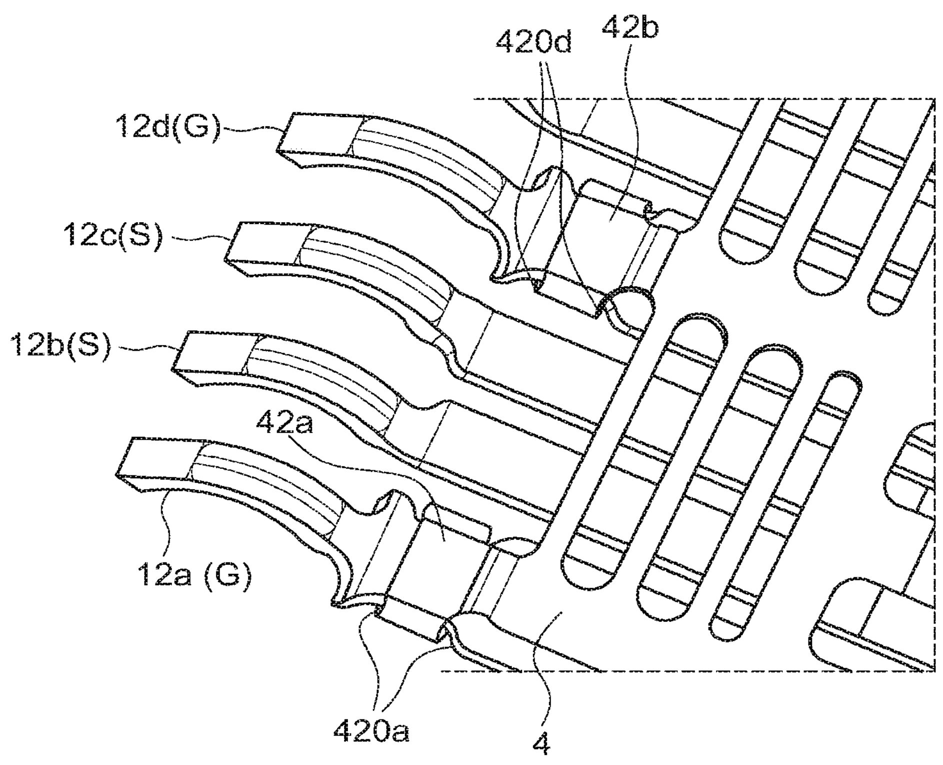
FIGS. 6E and 6F depict illustrative views of portions of an exemplary self-aligning flexible shield connected to terminal end sections of electrical conductors of an exemplary wafer according to embodiments of the invention.
Figure 6F:
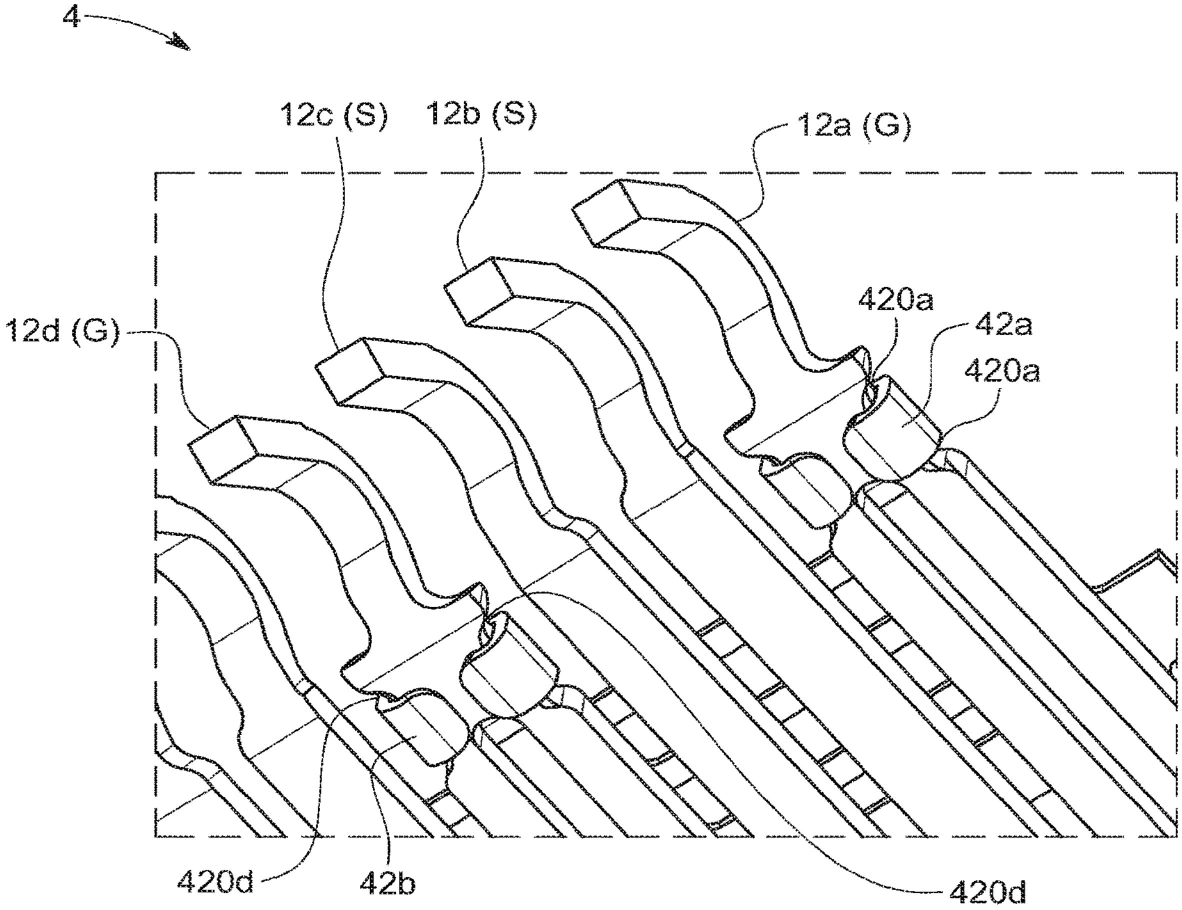

Referring now to FIGS. 6E and 6F there is illustrated top and bottom views, respectively, depicting the ground (G), terminal end sections 12*a,d* formed such that each includes an indentation 420*a,d* for receiving a portion 42*a,b* of the shield 4. The indentations further function to help prevent the corresponding portions 42*a, b* of the shield 4 (and the shield 4 itself) from moving.

With reference now to FIG. 7, there is depicted a side view of module PCB 3 mechanically secured, and electrically connected, to terminal end section 11*a* on a top surface of the PCB 3 and terminal end section 12*a* on a bottom surface of the PCB 3 by press fitting or otherwise inserting the module PCB 3 in between sections 11*a*, 12*a*. While only one of each terminal end section 11*a-n*, 12*a-n* is shown it should be understood that each terminal end section 11*a-n* and 12*a-n* may make similar mechanical and electrical connection to the module PCB 3.

FIG. 7 also depicts portion 41*a* of one end of shield 6 configured to function to make electrical and mechanical contact with ground (G), terminal end section 11*a* of top wafer 11 and portion 42*a* of one end of shield 4 configured to function to make electrical and mechanical contact with ground (G), terminal end section 12*a* of bottom wafer 12. Further, as shown the opposite ends of shields 4,6 comprise secondary end portions 44*a*, 43*a*, respectively, each configured to function to make electrical connection to, and mechanical contact with, ends 51*a*, 52*a* of ground sections of rigid shields and with cantilever beam sections 120*a*, 130*a*, respectively of ground conductors (not shown in FIG. 7).

Though FIG. 7 depicts the connection of the flexible shields 4,6 to ground conductors we shall utilize FIG. 7 to explain additional functions and features of inventive flexible shields provided by the present invention. In accordance with embodiments of the invention, the shields 4,6 cover respective portions (i.e., first portions) of ground (G) conductors 12*a-n* of transmission lines of wafer 12. To provide a desirable impedance and resulting return loss for a transmission line that includes differential signal (S) conductors (again, not shown in FIG. 7, but see for example, sections 12*b,c* in FIG. 6B) a lengthwise, longitudinal portion $p_{1A}$ of each shield 4,6 may be configured at a nominal distance $d_1$ (e.g., 0.15 millimeters, nominal) from a cantilever beam section of electrical signal (S) conductors of a corresponding pair of differential signal (S) conductors of a transmission line to, for example, affect an impedance of the transmission line.

In an embodiment, the secondary end portions 43*a*, 44*a* (e.g., opposing cantilever springs) of flexible shields 4,6 may function to assist in the mechanical separation of each lengthwise portion $p_{1A}$ of a respective shield 4,6 from cantilever beam sections of each (S) signal conductor of a corresponding pair of differential signal (S) conductors in order to provide a desirable return loss for a transmission line. Accordingly, shields 4,6 may function as a desired common mode reference.

More generally, in embodiments of the invention, each lengthwise, longitudinal portion $p_{1A}$ of a particular flexible shield may be configured at a nominal distance $d_1$ from a corresponding cantilever beam section of a (S) signal conductor of a corresponding pair of differential signal (S) conductors to provide a desirable impedance and resulting return loss for a transmission line. Said another way, based on a desirable impedance or its associated return loss for a given transmission line of a connector, a shield may be configured a specified distance $d_1$ away from a corresponding cantilever beam section of each (S) signal conductor of a corresponding pair of differential signal (S) conductors, where the distance $d_1$ achieves such an impedance/return loss.

Though shown as a circular or oval shape in FIG. 7 it should be understood that the secondary end portions 43*a*, 44*a* (e.g., opposing cantilever springs) may be configured and formed in alternative shapes provided such an alternative shape functions to mechanically separate a lengthwise, longitudinal portion $p_{1A}$ of a respective shield from a cantilever beam section of a (S) signal conductor of a corresponding pair of differential signal (S) conductors in order to provide a desirable impedance/return loss for a transmission line.

It should be noted that FIG. 7 depicts a side view. Accordingly, lengthwise portion $p_{1A}$ in actuality represents one flexible, longitudinal portion of an area of flexible shield 4. As noted previously in our discussion of FIG. 4A, $p_{1a}$ is one of many flexible, longitudinal portions that make up an area that substantially corresponds to a flexible body 45 of flexible shield 4.

In addition to impedance affects, the inventive flexible shields are believed to affect the resonant frequencies and cross-talk performance of connectors provided by the present invention.

In more detail, the flexible, longitudinal portions $p_{1A}$ may be said to create a responsive, electromagnetic cavity in the longitudinal direction of the path of a signal being conducted through a conductor of a wafer. In particular, in embodiments of the invention as the length of longitudinal portions $p_{1A}$ of shield 4 are progressively shortened the resonant frequency modes that can be generated by the corresponding, resulting cavity are believed to progressively increase in frequency.

As described in more detail below, the increased proximity of mechanical welds (see welds 600*a* to 600*d* in FIG. 10A) is also believed to result in a shifting of the resonant frequencies to higher frequencies within such a cavity.

Further, the inventors have discovered that the flexible shields 4,6 as shown in the figures and as described herein improve cross-talk between signal (S) conductors of wafers 11, 12, for example. In more detail, the transverse, flexible portions pin create a proximate Faraday cage with a near field boundary to differential signal (S) conductors covered by the shield 4.

As mentioned previously, the inventive flexible shields and corresponding transverse, flexible portions $p_{1b}$ flex as the corresponding ground (G) conductors of a transmission line they are attached to flexes. Accordingly, this ability to flex allows a respective flexible shield to create and maintain an electromagnetic boundary that reduces the energy of an electric field generated by the signal (S) conductors of the transmission line thereby limiting the adverse coupling of components of such an electric field to differential signal conductors of transmission lines within an adjacent wafer.

Figure 8A:
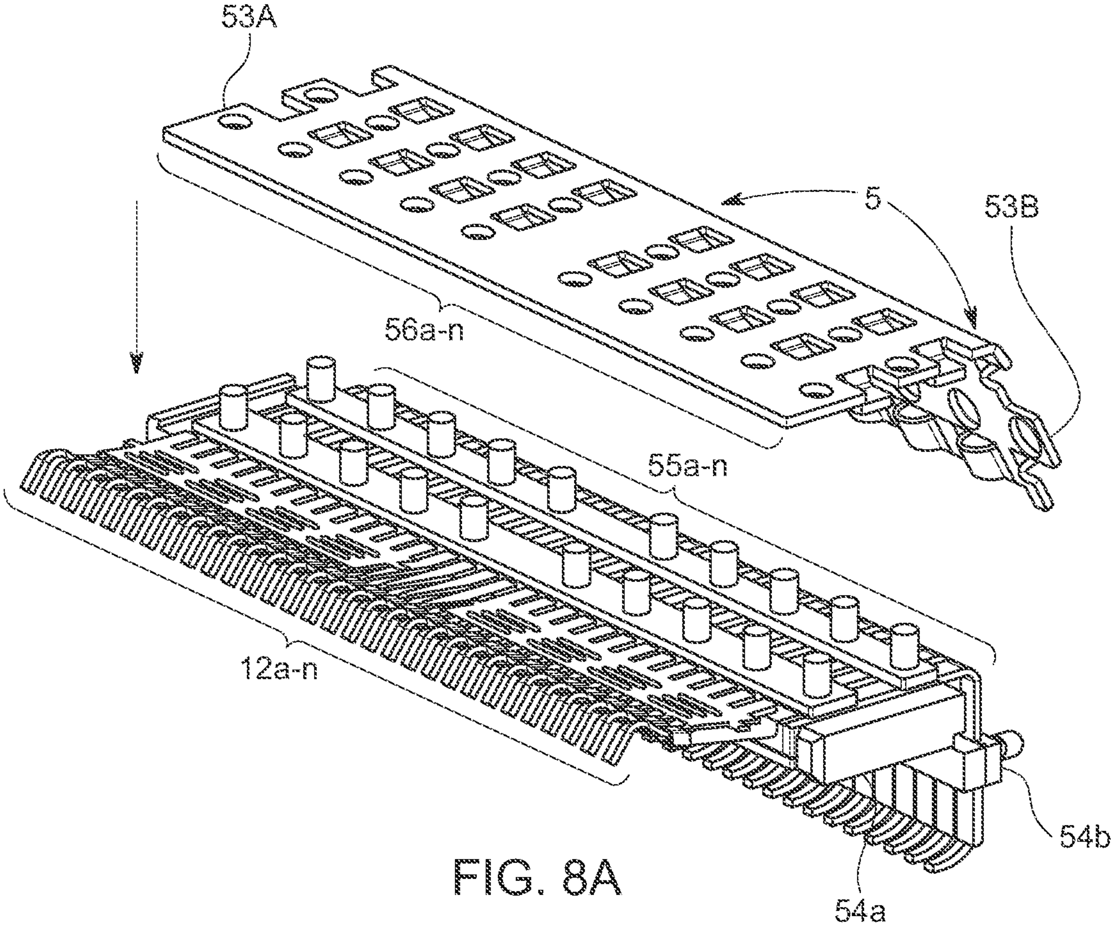
FIGS. 8A to 8C illustrate an exemplary rigid shield according to embodiments of the invention.
Figure 8B:
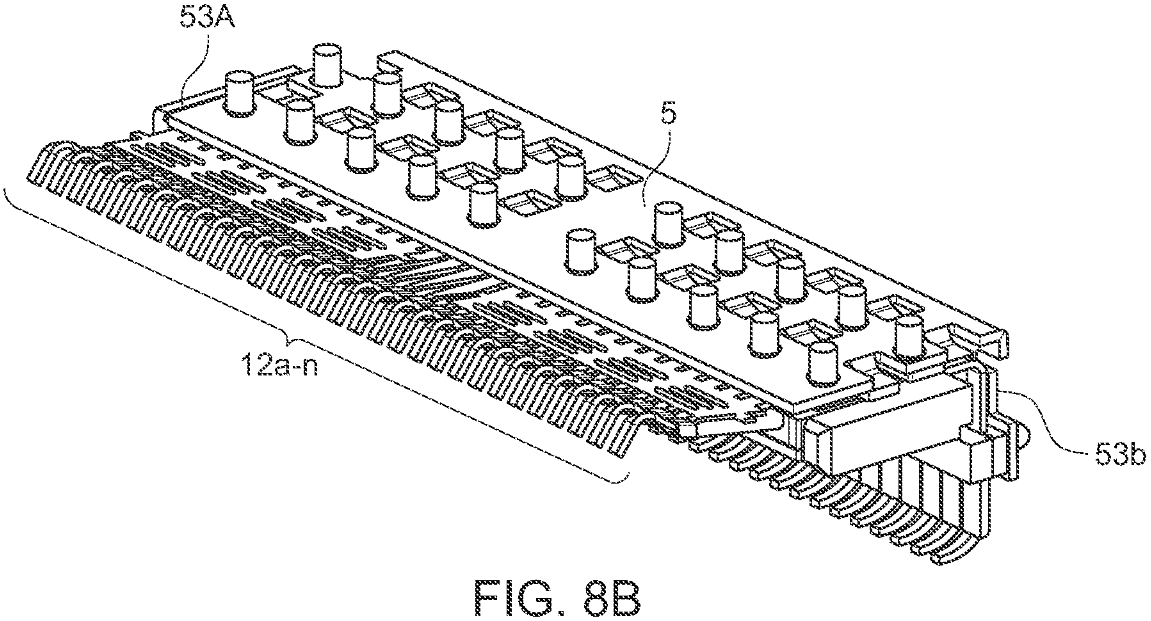
Figure 8C:
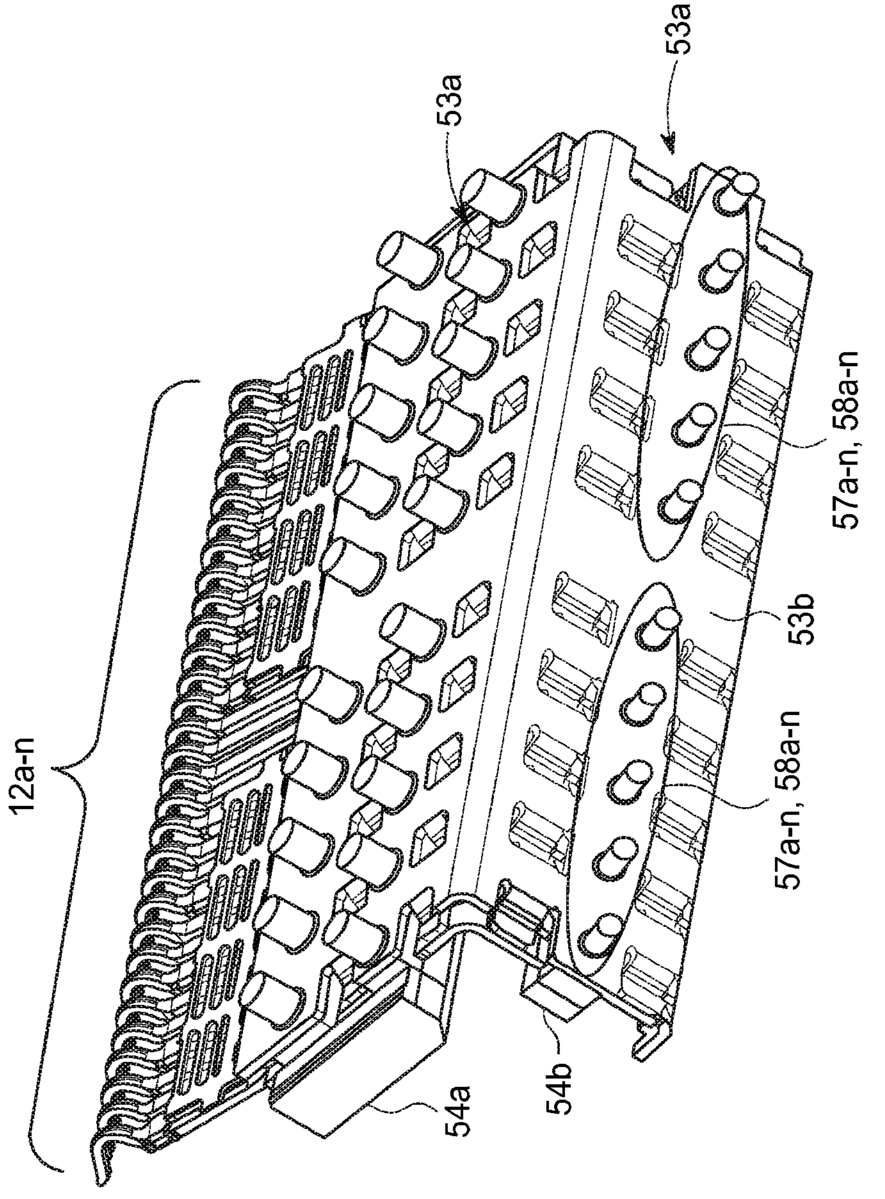

Referring now to FIGS. 8A to 8C there is depicted a second shield 5 comprising top and rear sections 53*a*, 53*b*, respectively. In an embodiment, the entire shield 5 may be considered an electrical ground (G).

According to an embodiment of the invention, shield 5 may comprise a rigid shield. In comparison with the inventive flexible shields, inventive rigid shields provided by the present invention, such as shield 5 for example, may be configured to be dimensionally thicker than flexible shields and resist flexing in substantially the same direction and at substantially the same time as the ground (G) conductors (i.e., cantilever beam sections 120*a*, 130*a*) of wafers they are connected to. In embodiments of the invention rigid shields may be composed of a metallic material such as a copper alloy (e.g., C70250 or C70252). Alternatively, rigid shields may be composed of a plastic. When rigid shields are composed of a metal alloy they may be made using a metal stamping process.

In each embodiment, an inventive rigid shield may be configured to cover a second portion of each of the electrical ground conductors (i.e., the flexible shield covers a first portion) and may be connected to the cantilever beams of a ground (G) conductor of a wafer thereby functioning to provide mechanical support for the ground conductors and to provide a combined structure that withstands warping and other external forces.

As shown, the top section 53*a* may comprise a plurality of openings 56*a-n*, where each of the openings 56*a-n* functions to alignably receive a fastening structure 55*a-n* of a first molding 54*a*, such as a deformable peg or post composed of a plastic (e.g., a high temperature thermoplastic such as a liquid crystal polymer or "LCP"), for example. The combination of the structures 55*a-n* and openings 56*a-n* may function to align the top section 53*a* of the shield 50 with a top of the first molding 54*a* thereby aligning the top section 53*a* with ground conductors of the wafer 12 as described in more detail below. In an embodiment, the structures 55*a-n* may be a part of the first molding 54*a*.

With continued reference to FIGS. 8A and 8B, in an embodiment the rear section 53*b* of the shield 5 may be a movable section that is configured at an initial counterclockwise obtuse angle of x degrees with respect to the top section 53*a* (e.g., 115 degrees, or 25 degrees counterclockwise from a geometric plane that is at a right angle to the top section 53*a*) to permit the top section 53*a* of the shield 5 to be aligned with the first molding 54*a* and ground conductors of wafer 12 before the rear section 53*b* is moved to be aligned with ground conductors of the wafer 12, thus eliminating the need to simultaneously align both the top and rear sections 53*a*,53*b* of the shield 5 at the same time. In an embodiment, one the rear section 53*b* is moved into an aligned position with ground conductors of the wafer 12 it will remain there until it is connected as described below.

Upon aligning the top section 53*a*, the rear section 53*b* may then be aligned. Referring to FIG. 8C, in an embodiment, the rear section 53*b* may comprise a plurality of openings 58*a-n* (openings 58*a-n* are shown under the structures 57*a-n*), where each of the openings 58*a-n* functions to receive a second fastening structure 57*a-n* of a second molding 54*b*, such as a deformable peg or post composed of a plastic (e.g., a high temperature thermoplastic such as a liquid crystal polymer or "LCP"), for example, for example. The combination of the structures 57*a-n* and openings 58*a-n* may function to help align the rear section 53*b* of the shield 5 with the second molding 54*b*, thereby aligning the rear section 53*b* with ground conductors of the wafer 12 as described in more detail below. In an embodiment, the structures 57*a-n* may be a part of the second molding 54*b*.

It should be understood that while the discussion above focuses on aligning the top section 53*a* of the shield 5 for fastening prior to aligning the rear section 53*b*, this is merely exemplary. Alternatively, the rear section 53*b* may be aligned for fastening prior to top section 53*a*. In either case, the combination of the deformable structures and openings functions to self-align both the top and rear sections 53*a,b* of shields 4,5 over the moldings 54*a,b* thereby aligning the top and rear sections with ground conductors of the wafer 12. Thus, it may be said that the shields 4,5 are "self-alignable" or "self-aligning".

Figure 9A:
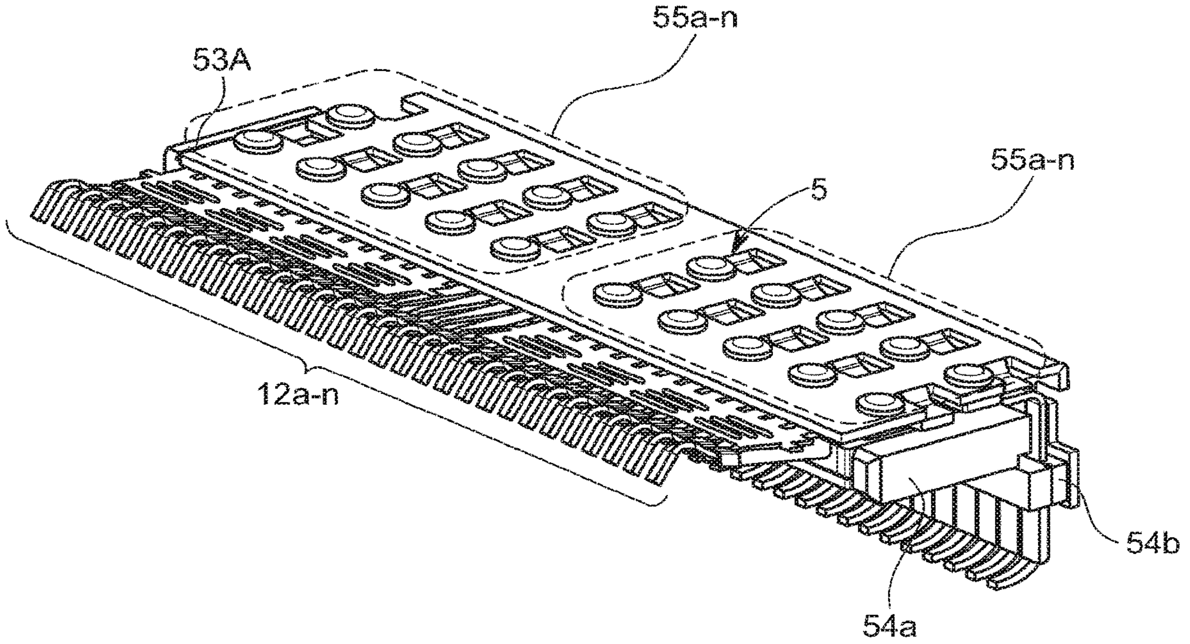
FIGS. 9A and 9B illustrate the fastening of an exemplary rigid shield to moldings and a wafer of an exemplary connector according to embodiments of the invention.
Figure 9B:
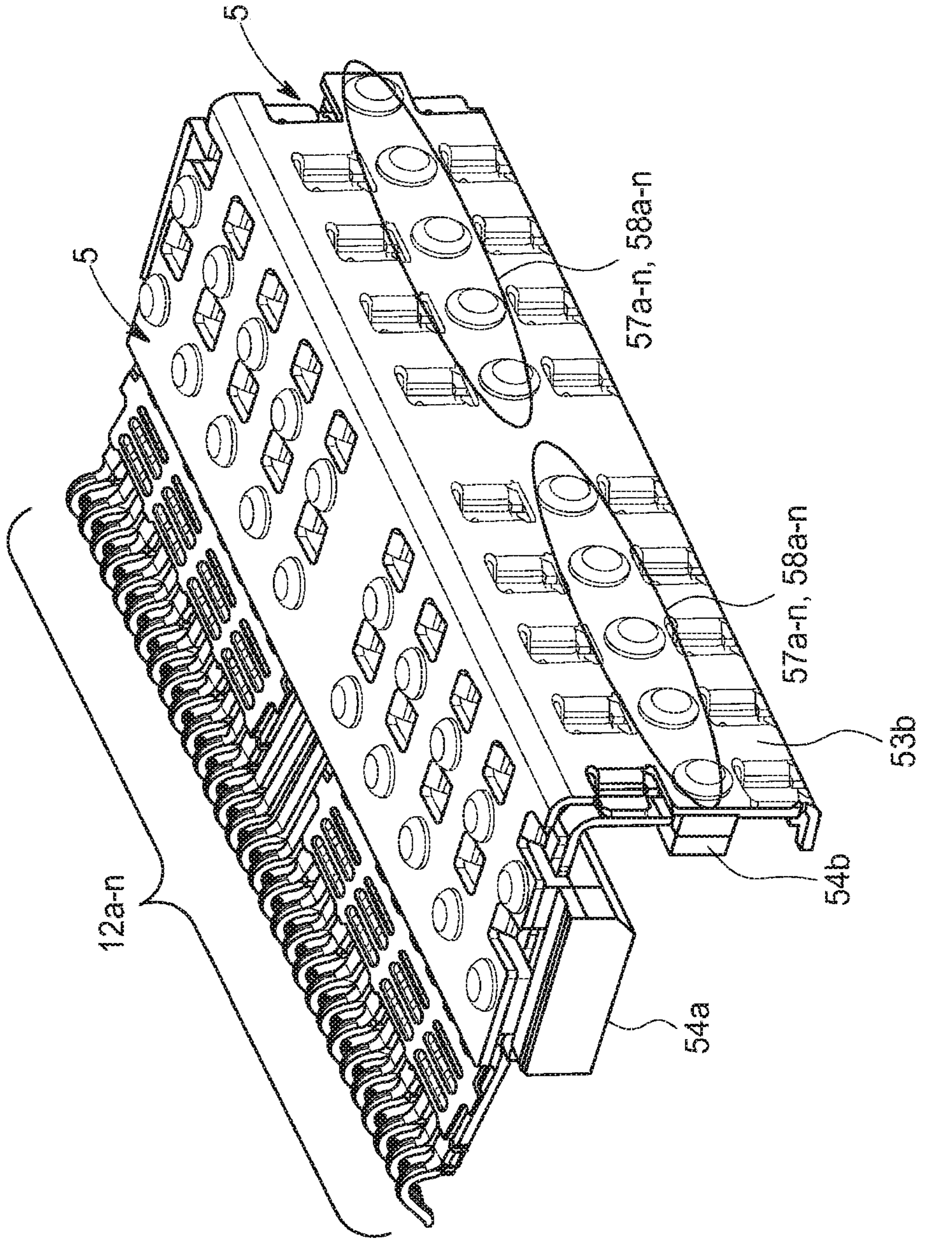

Continuing, after a section 53*a*,53*b* of shield 5 is aligned and positioned as described above it may be fastened to a respective molding 54*a*,*b*. Referring now to FIGS. 9A and 9B there is illustrated the fastening of the top and rear sections 53*a*,*b* of shield 5 to moldings 54*a*,*b* connected to wafer 12.

In FIG. 9A, each of the deformable fastening structures 55*a*-*n* of the first molding 54*a* that has been received by an opening 56*a*-*n* of the shield 5, for example, may be deformed (i.e., flattened or "mushroomed") by a heat staking process, for example, after passing through a respective opening 56*a*-*n* in order to increase a diameter of an end of such a structure 55*a*-*n* to a value that is greater than the value of a diameter of a respective opening 56*a*-*n* (i.e., the deformed end is wider than the opening) to securely fasten the top section 53*a* of the shield 5 to the first molding 54*a* which is also connected to ground conductors of the wafer 12 as described in more detail below. In an embodiment, molding 54*a* may be configured as a box with structure around a periphery and an opening in the middle to allow for welding, for example (see FIG. 10A).

One exemplary heat staking process may utilize a pulsed laser that heats each end of structures 55*a*-*n* to deform (i.e., melt) each end so as to increase a diameter of the end of such a structure 55*a*-*n* to a value that is greater than the value of a diameter of a respective opening 56*a*-*n*.

The rear section 53*b* may be similarly, securely fashioned. For example, referring to FIG. 9B, each of the deformable fastening structures 57*a*-*n* of the second molding 54*b* that has been received by an opening 58*a*-*n* of the shield 5 (openings 58*a*-*n* are shown under the structures 57*a*-*n*), for example, may be deformed (i.e., flattened or "mushroomed") by a heat staking process, for example, after passing through a respective opening 58*a*-*n* in order to increase a diameter of an end of such a structure 57*a*-*n* to a value that is greater than the value of a diameter of a respective opening 58*a*-*n* (i.e., the deformed end is wider than the opening) to securely fasten the rear section 53*b* of the shield 5 to the second molding 54*b* which is also connected to a ground conductors of wafer 12. As explained previously, one exemplary heat staking process may utilize a pulsed laser that heats each end of structures 57*a*-*n* to deform (i.e., melt) each end so as to increase a diameter of the end of such a structure 57*a*-*n* to a value that is greater than the value of a diameter of a respective opening 58*a*-*n*.

In an embodiment of the invention, though the inventive rigid shields may be configured geometrically different than a flexible shield, rigid shields may be similarly connected to wafer 11.

Having described exemplary flexible and rigid shields we now turn to a discussion of exemplary connections that function to connect the two shields to ground (G) conductors of a wafer.

Figure 10A:
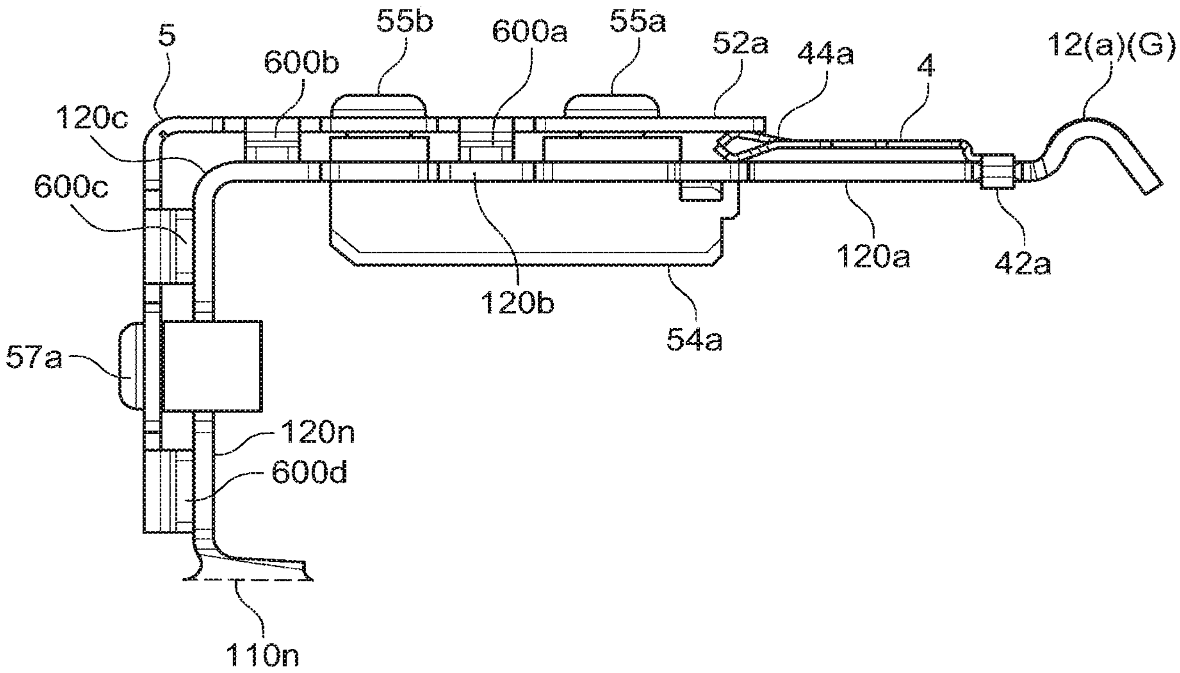
FIG. 10A depicts a side view of exemplary connections of an exemplary flexible shield and rigid shield to ground (G) conductors of an exemplary wafer and to one another according to an embodiment of the invention.

Referring now to FIG. 10A there is depicted a side view of exemplary connections of a flexible shield 4 and rigid shield 5 to a ground (G) conductor of a wafer as well as to each other. Though FIG. 10A only depicts the connection of the shields 4,5 to cantilever beam sections 120*a*-*n* and terminal end section 12*a* of one of ground conductor of wafer 12, it should be understood that the shields 4,5 may be similarly connected to substantially all of the ground (G) conductors of wafer 12.

In particular, the top and rear sections 53*a*,*b* of rigid shield 5 may be securely connected to cantilever beam sections 120*a*-*n* of a ground (G) conductor of wafer 12 using the combination of moldings 54*a*,*b*, deformable structures 55*a*, 57*a*, openings 54*a*,56*a* (not labeled in FIG. 10A) and a plurality of welds 600*a* to *d*. In an embodiment molding 54*a* comprises a box-like structure with an opening in the middle to allow for welding, for example.

Further, though FIG. 10A depicts four welds 600*a* to *d* it should be understood that more or less welds may be utilized provided the integrity of the connection of a rigid shield to a ground conductor is achieved. FIG. 10A also depicts secondary end portion 44*a* of flexible shield 4 configured to function to make electrical and mechanical contact with a cantilever beam section 120*a* of a ground (G) conductor and contact with an end 52*a* of rigid shield 5.

By connecting a rigid shield to the cantilever beam sections of a ground conductor, the welds function to add mechanical strength to the resulting combination of a corresponding wafer and rigid shield. Further, the welds reduce electrical resonance due to the fact that the welds, which connect multiple cantilever beam sections of a ground conductor to a rigid shield, creates a common ground stricture. Such a common ground structure functions as an electrical bridge across the connector that shields signals within conductors from electromagnetic interference and provides increased signal integrity (e.g. resonance may be improved or controlled by connecting a wafer and shield as described herein).

Figure 11:
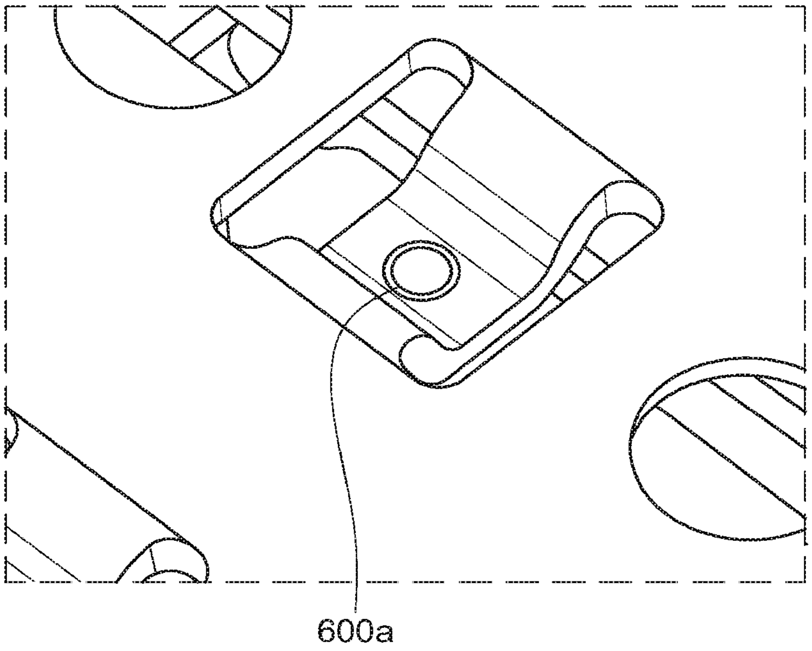
FIG. 11 depicts a close-up view of an exemplary weld that may be used to connect a portion of a rigid shield to a ground (G) conductor of an exemplary wafer according to an embodiment of the invention.

In embodiments of the invention, each weld 600*a* to *d* may be formed by applying a converging beam of laser light on to the weld to melt the weld to a respective cantilever beam section 120*a*-*n* and to a corresponding portion of rigid shield 5. FIG. 11 depicts an illustration of a close-up view of an exemplary welding position where an exemplary weld 600*a* may be created between a portion of a rigid shield and a cantilever bean section. In an exemplary embodiment, the diameter of a weld may be 0.16 mm. However, it should be understood that the dimensions of a weld may vary (e.g., a 0.2 mm diameter).

Figure 10B:
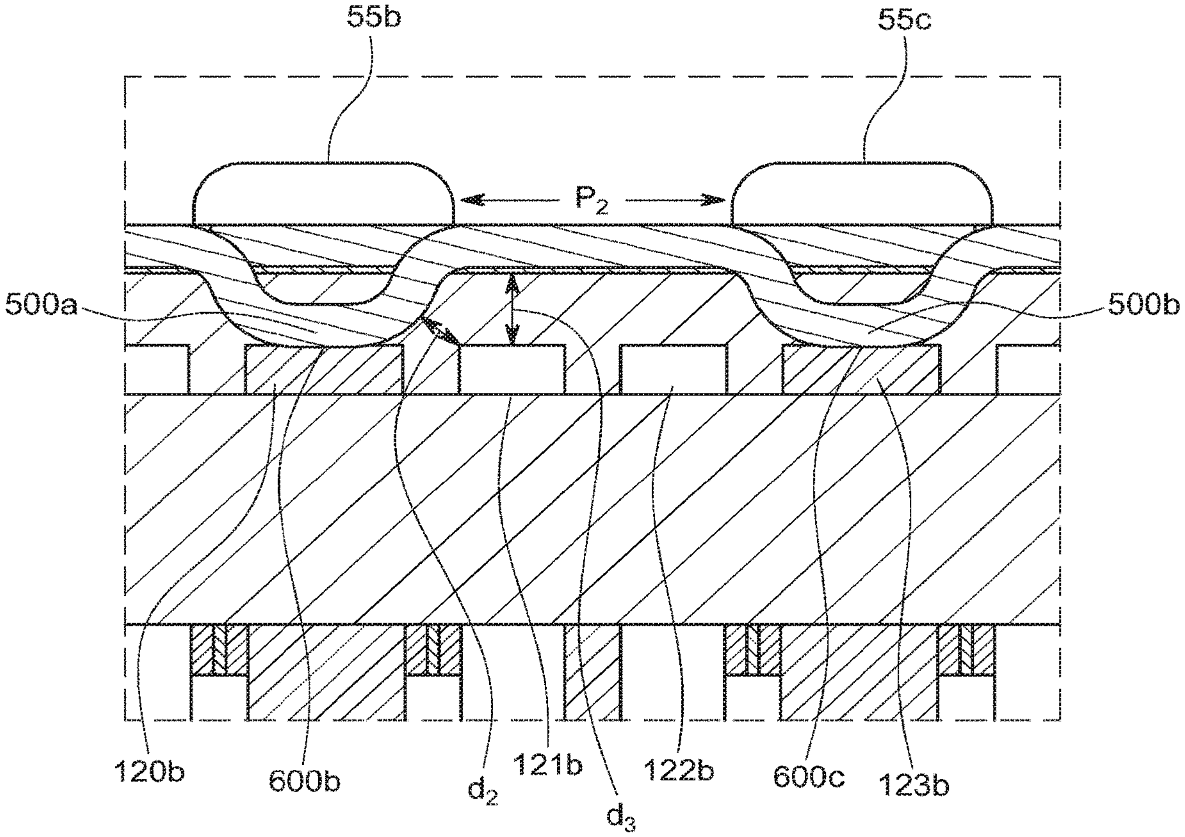
FIG. 10B depicts a cross-sectional view of the connections of a portion of a rigid shield to portions of a wafer according to an embodiment of the invention.

Referring now to FIG. 10B there is depicted a cross-sectional view of the connections of a portions 500*a*,*b* of rigid shield 5 to cantilever beam portions 120*b* and 123*b* of wafers, for example. In particular, portions of rigid shield 5 are securely connected to cantilever beam portions 120*b* and 123*b* of a ground (G) conductor of wafer 12 using welds 600*b*, 600*c*, for example. To provide a desirable capacitance for transmission lines that includes cantilever beam sections 121*b*, 122*b* of differential signal (S) conductors, portions 500*a*,*b* of rigid shield 5 should be a nominal distance $d_2$ from respective cantilever beam sections 121*b*, 122*b* of signal (S) conductors and a lengthwise portion $p_2$ of rigid shield 5 may be configured a nominal distance $d_3$ from the cantilever beam sections 121*b*, 122*b* of signal (S) conductors of a corresponding pair of differential signal (S) conductors. For example, in one embodiment the distances $d_2$, $d_3$ may be 0.16 mm and 0.29 mm (nominal), respectively, to provide acceptable capacitance.

More generally, in embodiments of the invention, portions of a rigid shield should be a nominal distance $d_2$ from respective cantilever beam sections of signal (S) conductors of a corresponding pair of differential signal (S) conductors and a lengthwise portion $p_2$ of a particular rigid shield should be a nominal distance $d_3$ from respective cantilever beam sections of a signal (S) of the corresponding pair of differential signal (S) conductors to provide a desirable capacitance and resulting voltage for a transmission line.

It should be understood that shield 5 is comprised of a plurality of portions $p_2$.

Similar to the inventive flexible shields provided by the present invention, inventive rigid shields may also affect resonance and cross-talk performance of an inventive connector 1.

In more detail, the portions $p_2$ may be said to create a responsive, electromagnetic cavity in the longitudinal direction of the path of a signal being conducted through a conductor of a wafer. In particular, in embodiments of the invention as the length of longitudinal portions $p_2$ of shield 5 are progressively shortened the resonant frequency modes that can be generated by the corresponding, resulting cavity are believed to progressively increase in frequency.

As described in more detail below, the increased proximity of mechanical welds (see welds 600*a* to 600*d* in FIG. 10A) is also believed to result in a shifting of the resonant frequencies to higher frequencies within such a cavity.

Further, the inventors have discovered that the rigid shield 5 as shown in the figures and as described herein improves cross-talk between signal (S) conductors of wafers 11, 12, for example. In more detail, transverse, flexible portions of shield 5 (not shown in FIG. 10B, but see FIG. 8C) create a proximate Faraday cage with a near field boundary to differential signal (S) conductors of a given transmission line of wafer 12 covered by the shield 5 thereby limiting the adverse coupling of components of such an electric field to differential signal conductors of transmission lines within an adjacent wafer, such as wafer 11.

Figure 10C:
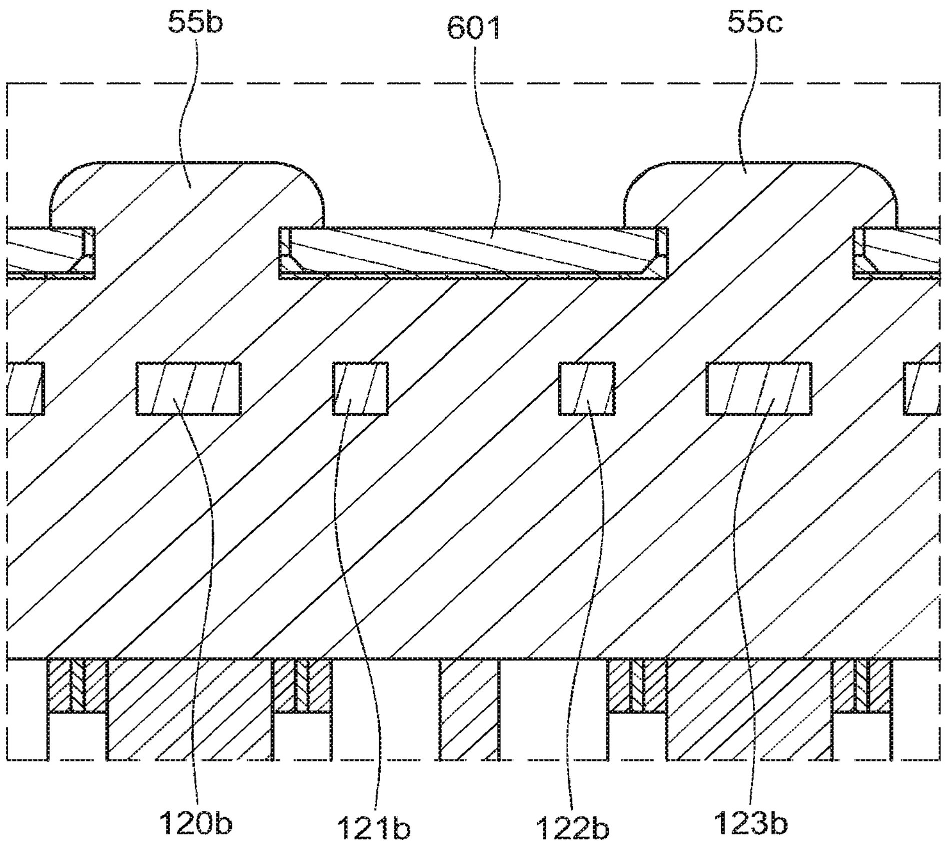
FIG. 10C depicts a cross-sectional view of a portion of a rigid shield according to an embodiment of the invention.

FIG. 10C depicts a cross-sectional view of a portion 601 of a rigid shield 5 according to an embodiment of the invention. The portion 601 may comprise a plastic and may function to mechanically support elements of the shield 5 and connector 1 and hold such elements together. Further, the portion 601 may function to electrically insulate elements of the connector 1 from one another. More particularly, the portion 601 may be made of a dielectric material having a dielectric constant that further functions to affect the electric field between, and therefore the voltage and capacitance between: (i), signal conductors 121*b*, 122*b*, (ii) signal and ground conductors 120*b*, 121*b* and 122*b*, 123*b* and (iii) the rigid shield 5 and the underlying signal and ground conductors 120*b* to 123*b*.

While benefits, advantages, and solutions to problems have been described above with regard to specific embodiments of the present invention, it should be understood that such benefits, advantages, and solutions and any element(s) that may cause or result in such benefits, advantages, or solutions, or cause such benefits, advantages, or solutions to become more pronounced are not to be construed as a critical, required, or an essential feature or element of any or all the claims appended to the present disclosure or that result from the present disclosure.

The invention claimed is:

1. An electrical connector, comprising:
- a housing; and
- a wafer comprising a plurality of signal conductors, a plurality of ground conductors, a flexible shield, and a rigid shield, wherein:
  - the flexible shield comprises a plurality of terminal end portions, a plurality of cantilever spring end portions, and a flexible shield body between the plurality of terminal end portions and the plurality of cantilever spring end portions;
  - the flexible shield body covers a first portion of the plurality of ground conductors; and
  - the rigid shield covers a second portion of the plurality of ground conductors.

2. The electrical connector according to claim 1, wherein a cantilever spring end portion among the plurality of cantilever spring end portions of the flexible shield makes electrical and mechanical contact with the rigid shield.

3. The electrical connector according to claim 1, wherein a cantilever spring end portion among the plurality of cantilever spring end portions of the flexible shield makes electrical and mechanical contact with a ground conductor among the plurality of ground conductors.

4. The electrical connector according to claim 1, wherein the plurality of cantilever spring end portions of the flexible shield make electrical and mechanical contact between the plurality of ground conductors and the rigid shield.

5. The electrical connector according to claim 1, wherein the plurality of terminal end portions of the flexible shield are secured to terminal ends of the plurality of ground conductors.

6. The electrical connector according to claim 1, wherein the plurality of terminal end portions of the flexible shield are crimped to terminal ends of the plurality of ground conductors.

7. The electrical connector according to claim 1, wherein:
- a terminal end of a ground conductor among the plurality of ground conductors comprises an indentation; and
- a terminal end portion among the plurality of terminal end portions of the flexible shield is secured to the indentation of the ground conductor.

8. The electrical connector as in claim 1, wherein the flexible shield is configured to flex in a same direction as the plurality of ground conductors yet maintain a nominal distance from the plurality of ground conductors.

9. The electrical connector as in claim 1, wherein:
- the wafer further comprises a molding;
- the molding comprises a plurality of posts;
- the rigid shield comprises a plurality of openings; and
- the plurality of posts of the molding extend through the plurality of openings of the rigid shield to secure the rigid shield with the molding.

10. The electrical connector as in claim 1, further comprising a plurality of welds between the rigid shield and the plurality of ground conductors.

11. The electrical connector as in claim 1, wherein a longitudinal portion of the flexible shield is configured at a nominal distance from a cantilever beam section of a signal conductor among the plurality of signal conductors.

12. The electrical connector as in claim 1, wherein:
- the flexible shield body covers a first portion of the plurality of signal conductors; and
- the rigid shield covers a second portion of the plurality of signal conductors.

13. The electrical connector as in claim 1, further comprising:
- a second wafer comprising a second plurality of signal conductors, a second plurality of ground conductors, a second flexible shield, and a second rigid shield, wherein:
  - the second flexible shield covers a first portion of the second plurality of ground conductors; and
  - the second rigid shield covers a second portion of the second plurality of ground conductors.

14. An electrical connector, comprising:
- a plurality of conductors;
- a flexible shield; and
- a rigid shield, wherein:
  - the flexible shield comprises a plurality of terminal end portions, a plurality of cantilever spring end portions, and a flexible shield body between the plurality of terminal end portions and the plurality of cantilever spring end portions;

the flexible shield body covers a first portion of the plurality of conductors;

the rigid shield covers a second portion of the plurality of conductors; and the plurality of cantilever spring end portions of the flexible shield make electrical and mechanical contact between the plurality of conductors and the rigid shield.

15. The electrical connector according to claim 14, wherein the plurality of terminal end portions of the flexible shield are secured to terminal ends of the plurality of conductors.

16. The electrical connector according to claim 14, wherein the plurality of terminal end portions of the flexible shield are crimped to terminal ends of the plurality of conductors.

17. The electrical connector according to claim 14, wherein:

a terminal end of a conductor among the plurality of conductors comprises an indentation; and a terminal end portion among the plurality of terminal end portions of the flexible shield is secured to the indentation of the conductor.

18. The electrical connector as in claim 14, wherein the flexible shield is configured to flex in a same direction as the plurality of conductors yet maintain a nominal distance from the plurality of conductors.

19. The electrical connector as in claim 14, wherein a longitudinal portion of the flexible shield is configured at a nominal distance from a cantilever beam section of a conductor among the plurality of conductors.

20. The electrical connector as in claim 14, further comprising a plurality of welds between the rigid shield and the plurality of conductors.

* * * * *